(12) United States Patent
Cho et al.

(10) Patent No.: US 12,050,498 B2
(45) Date of Patent: Jul. 30, 2024

(54) ELECTRONIC DEVICE AND METHOD OF CONTROLLING DISCHARGE OF EXTERNAL ELECTRONIC DEVICE USING THE SAME

(71) Applicant: Samsung Electronics Co., Ltd., Suwon-si (KR)

(72) Inventors: Hyongrae Cho, Suwon-si (KR); Seungchul Son, Suwon-si (KR); Kyungmin Lee, Suwon-si (KR); Gijae Lee, Suwon-si (KR); Jebin Lee, Suwon-si (KR); Sangjae Jung, Suwon-si (KR); Jeongseob Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 18/149,408

(22) Filed: Jan. 3, 2023

(65) Prior Publication Data

US 2023/0251698 A1 Aug. 10, 2023

Related U.S. Application Data

(63) Continuation of application No. PCT/KR2022/021305, filed on Dec. 26, 2022.

(30) Foreign Application Priority Data

Feb. 8, 2022 (KR) ........................ 10-2022-0016543

(51) Int. Cl.
*G06F 1/26* (2006.01)
*H04L 12/10* (2006.01)
*H04L 12/12* (2006.01)

(52) U.S. Cl.
CPC .............. *G06F 1/266* (2013.01); *H04L 12/10* (2013.01); *H04L 12/12* (2013.01)

(58) Field of Classification Search
CPC ..... G06F 1/266; G06F 13/4077; H04L 12/10; H04L 12/12
See application file for complete search history.

(56) References Cited

U.S. PATENT DOCUMENTS 8,084,987 B2 12/2011 Hurtz
8,847,554 B2 9/2014 Sunderlin
(Continued)

FOREIGN PATENT DOCUMENTS

JP 5669320 B2 2/2015
JP 6514866 B2 5/2019
(Continued)

OTHER PUBLICATIONS

International Search Report dated Mar. 24, 2023, issued in International Application No. PCT/KR2022/021305.

*Primary Examiner* — Nimesh G Patel
(74) *Attorney, Agent, or Firm* — Jefferson IP Law, LLP

(57) ABSTRACT

An electronic device is provided. The electronic device includes a processor operatively connected to a connector, a power supply circuit, a discharge circuit, a first switch, and a second switch, and configured to detect a connection of an external electronic device through the connector in a state in which the discharge circuit is activated, perform first discharge of discharging a current of the connected external electronic device using the discharge circuit for a designated time based on the connection of the external electronic device, control the first switch to cut off the electrical connection between the discharge circuit and the ground after performing the first discharge, control the second switch to electrically connect the connector and power supply circuit to supply designated power to the external (Continued)

electronic device through the connector, and perform communication with the external electronic device based on a communication connection with the external electronic device.

20 Claims, 25 Drawing Sheets

(56) References Cited

U.S. PATENT DOCUMENTS

| | | | |
|---|---|---|---|
| 9,774,273 B2 | 9/2017 | Suzuki et al. | |
| 9,791,906 B2 | 10/2017 | Hijazi et al. | |
| 9,923,398 B2 | 3/2018 | Toya et al. | |
| 10,199,837 B2* | 2/2019 | Jung | H02J 7/0036 |
| 10,261,934 B2 | 4/2019 | Lim | |
| 11,204,882 B2 | 12/2021 | Son et al. | |
| 11,244,081 B2 | 2/2022 | Gang et al. | |
| 11,277,014 B1 | 3/2022 | Lei et al. | |
| 11,307,630 B2 | 4/2022 | Takei et al. | |
| 2004/0119495 A1* | 6/2004 | Grillo | H04L 25/085 |
| | | | 326/21 |
| 2010/0280676 A1* | 11/2010 | Pabon | G06F 1/266 |
| | | | 700/295 |
| 2011/0181432 A1 | 7/2011 | Ou et al. | |
| 2011/0208981 A1* | 8/2011 | Kou | G06F 1/266 |
| | | | 713/300 |
| 2013/0049680 A1 | 2/2013 | Katsumata | |
| 2013/0235493 A1* | 9/2013 | Meng | G06F 1/266 |
| | | | 361/18 |
| 2015/0188344 A1* | 7/2015 | Wang | G06F 1/266 |
| | | | 320/107 |
| 2017/0063123 A1* | 3/2017 | Horie | H02J 7/00712 |
| 2017/0180224 A1 | 6/2017 | Yeo | |
| 2022/0011839 A1 | 1/2022 | Park et al. | |

FOREIGN PATENT DOCUMENTS

| | | |
|---|---|---|
| JP | 2021-197104 A | 12/2021 |
| KR | 10-2006-0007919 A | 1/2006 |
| KR | 10-2014-0117084 A | 10/2014 |
| KR | 10-2015-0107343 A | 9/2015 |
| KR | 10-2016-0145414 A | 12/2016 |
| KR | 10-1687212 B1 | 12/2016 |
| KR | 10-2017-0055866 A | 5/2017 |
| KR | 10-1739336 B1 | 5/2017 |
| KR | 10-1756866 B1 | 7/2017 |
| KR | 10-2020-0032546 A | 3/2020 |
| KR | 10-2020-0110006 A | 9/2020 |
| KR | 10-2331825 B1 | 11/2021 |
| KR | 10-2023-0018630 A | 2/2023 |
| KR | 10-2023-0093497 A | 6/2023 |

* cited by examiner

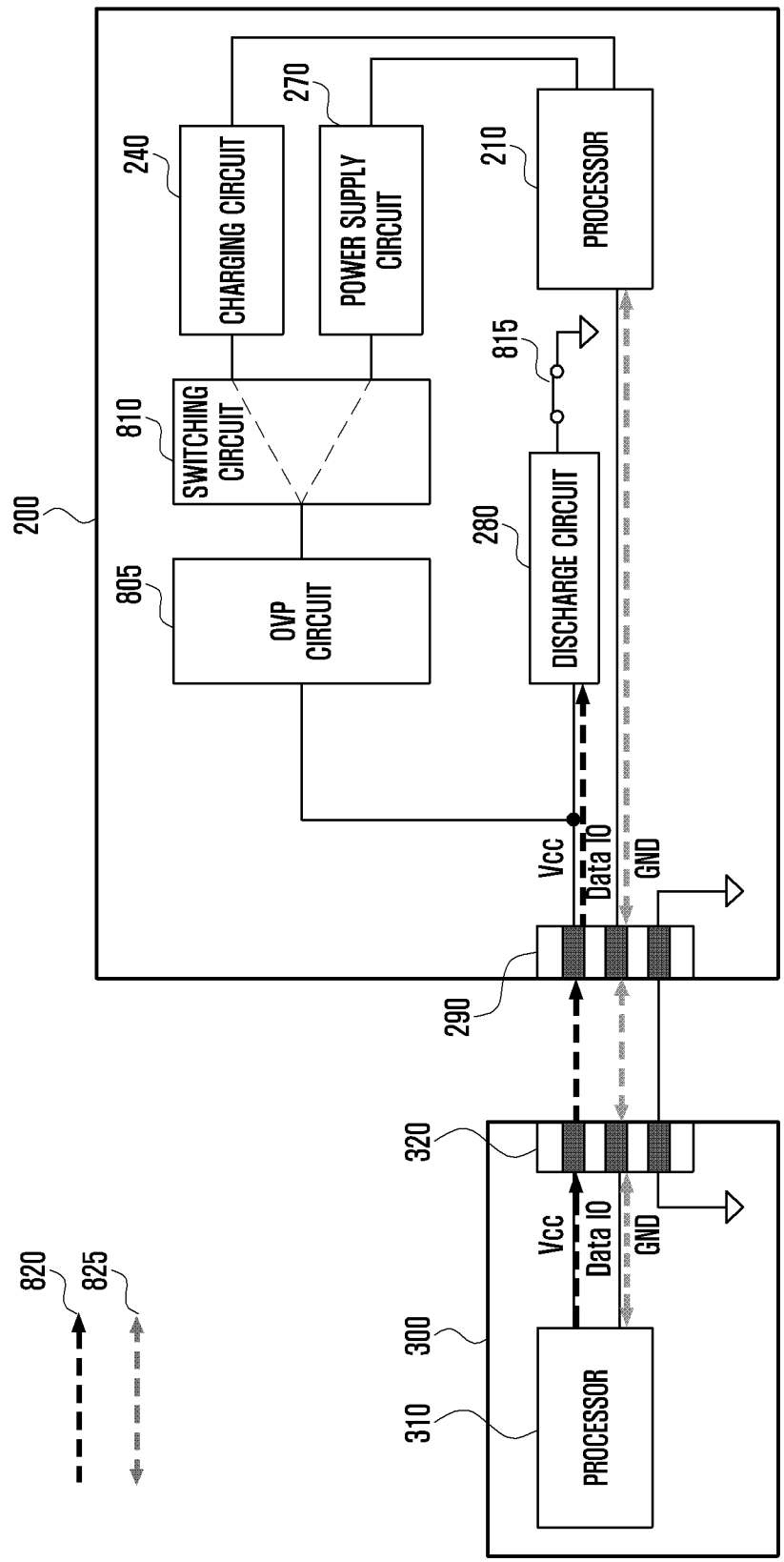

ELECTRONIC DEVICE AND METHOD OF CONTROLLING DISCHARGE OF EXTERNAL ELECTRONIC DEVICE USING THE SAME

CROSS-REFERENCE TO RELATED APPLICATION(S)

This application is a continuation application, claiming priority under § 365(c), of an International application No. PCT/KR2022/021305, filed on Dec. 26, 2022, which is based on and claims the benefit of a Korean patent application number 10-2022-0016543, filed on Feb. 8, 2022, in the Korean Intellectual Property Office, the disclosure of which is incorporated by reference herein in its entirety.

TECHNICAL FIELD

The disclosure relates to an electronic device and a method of controlling discharge of an external electronic device using the same.

BACKGROUND ART

When a connection of an external electronic device (e.g., keyboard) is detected through a connector, such as a POGO terminal, an electronic device may supply power to the external electronic device to perform communication with the external electronic device. In the case that a communication connection with the electronic device is disconnected, the external electronic device may perform an operation of resetting a power source that enables a voltage stored in a capacitor of a power stage to be less than or equal to a designated voltage.

The above information is presented as background information only to assist with an understanding of the disclosure. No determination has been made, and no assertion is made, as to whether any of the above might be applicable as prior art with regard to the disclosure.

DISCLOSURE

Technical Problem

However, a discharge time required for discharging the voltage stored in the capacitor of the power stage to be less than or equal to the designated voltage may be slow, and accordingly, the operation of resetting the power source of the external electronic device may also take a long time. Before the power source of the external electronic device is reset, for example, in a state in which the voltage of the external electronic device does not drop to less than or equal to a designated voltage, in the case that the external electronic device is reconnected to the electronic device, a malfunction of the external electronic device may occur. Due to a malfunction of the external electronic device, the electronic device may fail in a communication connection with the external electronic device.

An electronic device according to various embodiments of the disclosure may perform first discharge of discharging a current received from an external electronic device using a discharge circuit for a designated time based on being connected to the external electronic device, and perform second discharge of discharging a current received from the external electronic device using a discharge circuit for a designated time in the case that communication with the external electronic device is not connected after performing the first discharge to enable a voltage of the external electronic device to be equal to or lower than a designated voltage.

Aspects of the disclosure are to address at least the above-mentioned problems and/or disadvantages and to provide at least the advantages described below. Accordingly, an aspect of the disclosure is to provide an electronic device that, in the case that the electronic device fails in a communication connection with the external electronic device in a state in which the electronic device is connected to an external electronic device through a connector, discharges a current received from the external electronic device using a discharge circuit for a designated time to enable a voltage of the external electronic device to be equal to or less than a designated voltage.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a connector, a power supply circuit, a discharge circuit, a first switch configured to control an electrical connection between the discharge circuit and a ground, a second switch configured to control an electrical connection between the connector and the power supply circuit, and a processor operatively connected to the connector, the power supply circuit, the discharge circuit, the first switch, and the second switch, wherein the processor may be configured to detect a connection of an external electronic device through the connector in a state in which the discharge circuit is activated, to perform first discharge of discharging a current of the connected external electronic device using the discharge circuit for a designated time based on the connection of the external electronic device, to control the first switch to cut off the electrical connection between the discharge circuit and the ground after performing the first discharge, to control the second switch to electrically connect the connector and the power supply circuit to supply designated power to the external electronic device through the connector, and to perform communication with the external electronic device based on a communication connection with the external electronic device.

In accordance with another aspect of the disclosure, a method for an electronic device to control discharge of an external electronic device is provided. The method includes detecting a connection of the external electronic device through a connector in a state in which a discharge circuit of the electronic device is activated, performing first discharge of discharging a current of the connected external electronic device using the discharge circuit for a designated time based on the connection of the external electronic device, controlling a first switch to cut off the electrical connection between the discharge circuit and a ground after performing the first discharge, controlling the second switch to electrically connect the connector and a power supply circuit to supply designated power to the external electronic device, and performing communication with the external electronic device based on a successful communication connection with the external electronic device.

Advantageous Effects

An electronic device according to various embodiments of the disclosure can discharge a current received from an external electronic device using a discharge circuit for a designated time to attempt a communication connection with the external electronic device in a state in which a voltage of the external electronic device is equal to or less than a designated voltage. As a communication connection with the external electronic device is attempted in a state in which a voltage of the external electronic device is equal to or less than a designated voltage, the communication connection with the external electronic device can be smoothly performed without a malfunction.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 8A, 8B, 8C, and 8D are diagrams illustrating a method of controlling discharge of an external electronic device in the case that the external electronic device is connected to an electronic device according to various embodiments of the disclosure;

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
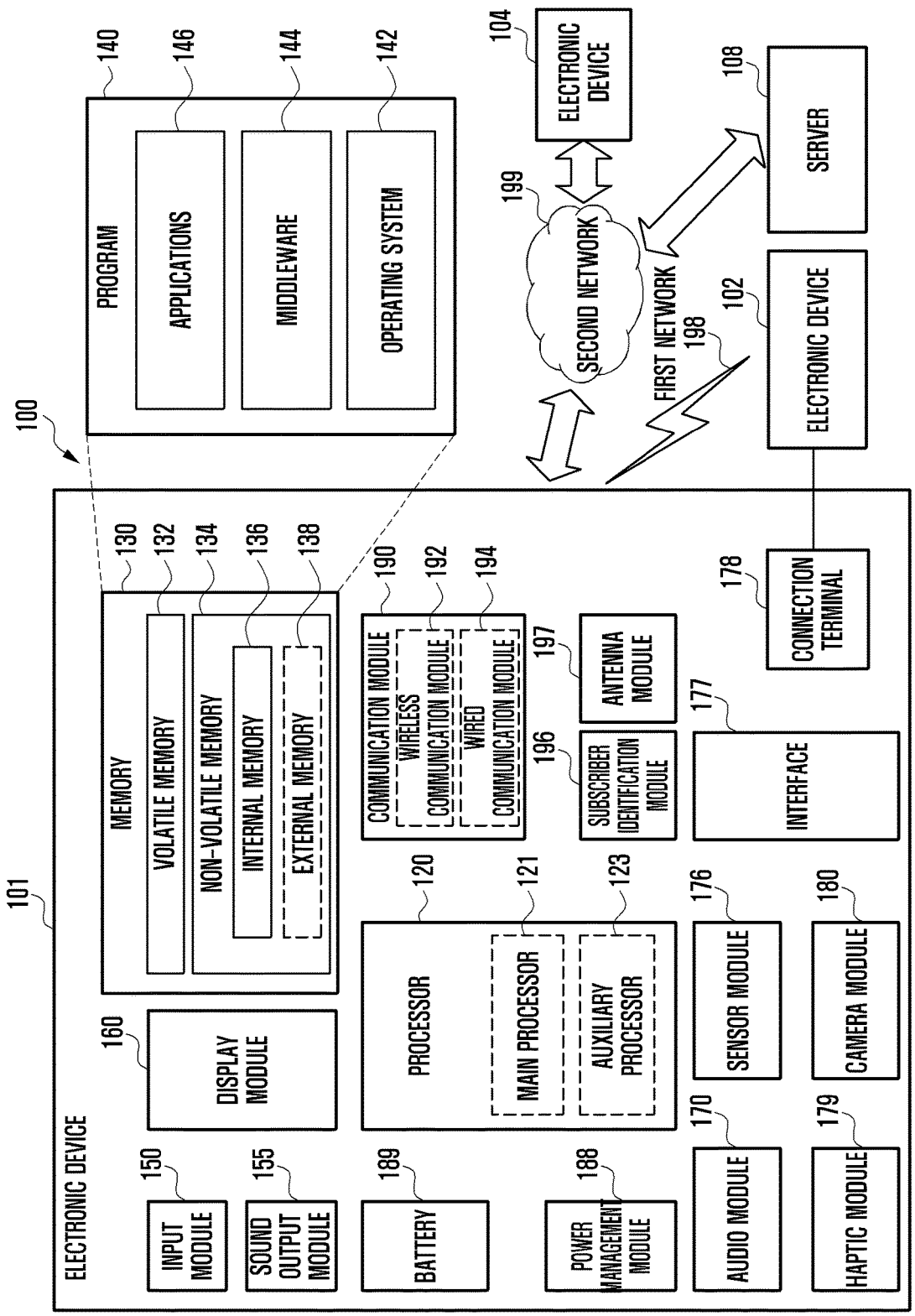
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to another embodiment, the electronic device 101 may communicate with the electronic device 104 via the server 108. According to yet another embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to yet another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to yet another embodiment, the auxiliary processor 123 (e.g., an image signal processor or a communication processor) may be implemented as part of another component (e.g., the camera module 180 or the communication module 190) functionally related to the auxiliary processor 123. According to yet another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to yet another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to yet another embodiment, the display module 160 may include a touch sensor adapted to detect a touch, or a pressure sensor adapted to measure the intensity of force incurred by the touch.

The audio module 170 may convert a sound into an electrical signal and vice versa. According to yet another embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to yet another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to yet another embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to yet another embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to yet another embodiment, the haptic module 179 may include, for example, a motor, a piezoelectric element, or an electric stimulator.

The camera module 180 may capture a still image or moving images. According to yet another embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to yet another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to yet another embodiment, the antenna module 197 may include an antenna including a radiating element composed of a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to various embodiments, the antenna module 197 may form mmWave antenna module. According to yet another embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to yet another embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to yet another embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to yet another embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to yet another embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
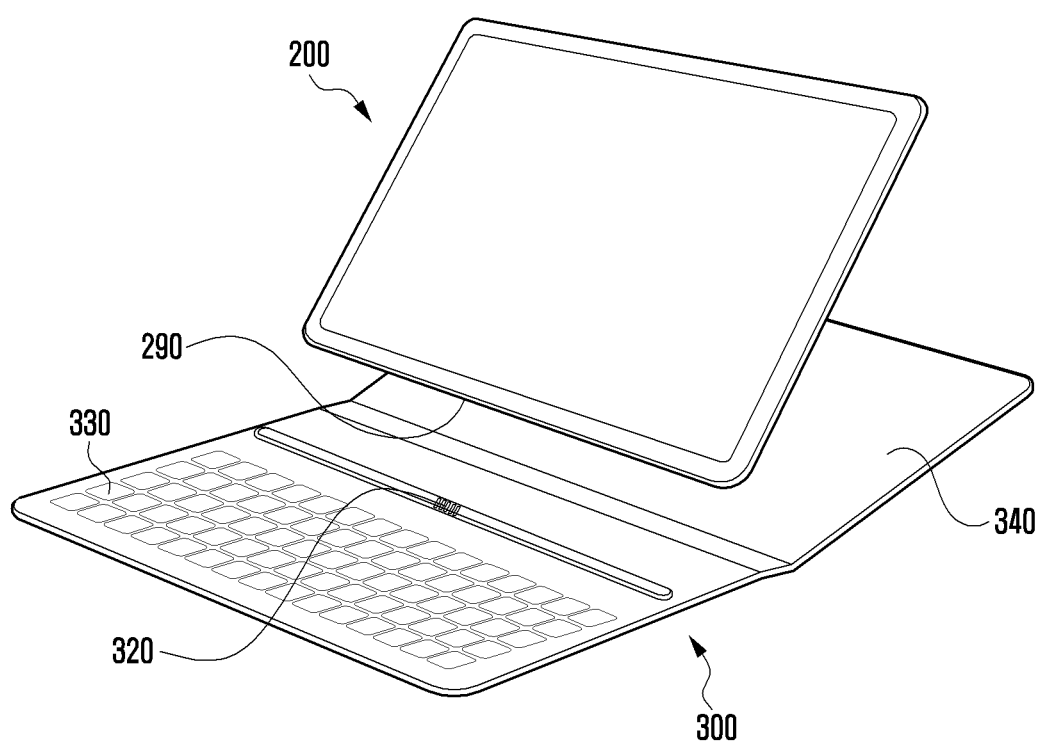
FIG. 2 is a perspective view illustrating an electronic device and an external electronic device according to an embodiment of the disclosure.

FIG. 2 is a perspective view illustrating an electronic device 200 and an external electronic device 300 according to an embodiment of the disclosure.

Referring to FIG. 2, the external electronic device 300 may be detachably coupled to the electronic device 200 (e.g., the electronic device 101 of FIG. 1). The external electronic device 300 may be electrically connected to the electronic device 200. The external electronic device 300 may be various input devices 330 (e.g., physical keyboard or touch pad), and transmit an input signal input through the input device 330 to the electronic device 200. In an embodiment, the external electronic device 300 may be combined with a cover 340 for protecting the electronic device 200 from an external impact. However, the disclosure is not limited thereto.

Referring to FIG. 2 according to various embodiments, the external electronic device 300 is described as a device including the input device 330, but the disclosure is not limited thereto.

Figure 3:
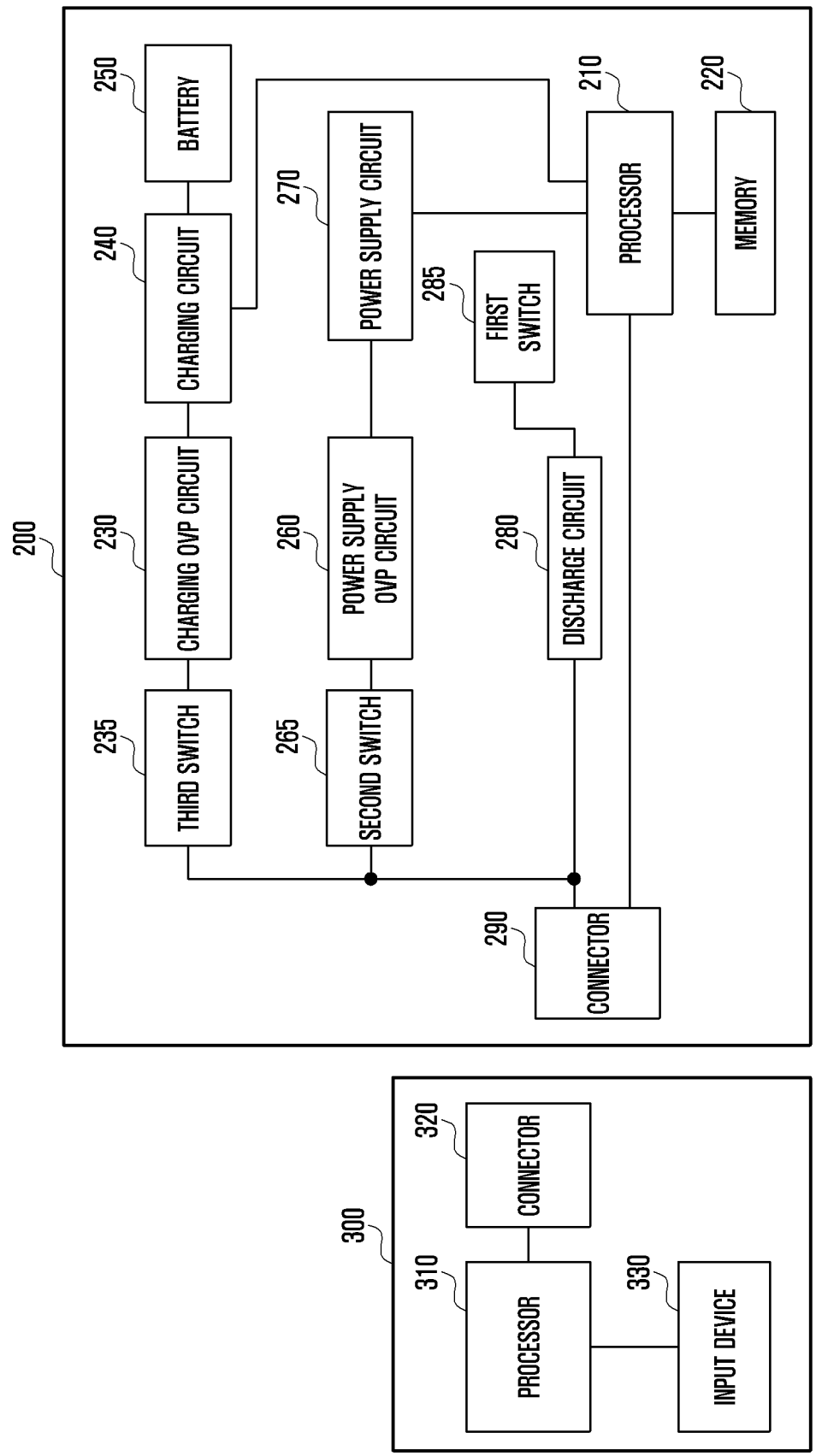
FIG. 3 is a block diagram illustrating an electronic device and an external electronic device according to an embodiment of the disclosure.

FIG. 3 is a block diagram illustrating the electronic device 200 and the external electronic device 300 according to an embodiment of the disclosure.

Referring to FIG. 3, the electronic device 200 (e.g., the electronic device 101 of FIG. 1) may include at least one of a processor 210 (e.g., the processor 120 of FIG. 1), a memory 220 (e.g., the memory 130 of FIG. 1), a charging over voltage protect (OVP) circuit 230, a charging circuit 240, a battery 250 (e.g., the battery 189 of FIG. 1), a power supply OVP circuit 260, a power supply circuit 270, a discharge circuit 280, a connector 290 (e.g., the connection terminal 178 of FIG. 1), a first switch 285, a second switch 265, or a third switch 235.

In an embodiment, the external electronic device 300 may include a processor 310, a connector 320, and/or an input device 330.

In another embodiment, in the electronic device 200 and the external electronic device 300, at least one of the mentioned components may be omitted or one or more other components may be added.

In various embodiments, the memory 220 may perform a function of storing a program for processing and controlling the processor 210 of the electronic device 200, an operating system (OS), various applications, and/or input/output data and store a program for controlling the overall operation of the electronic device 200. The memory 220 may store various configuration information required when the electronic device 200 processes functions related to various embodiments of the disclosure.

In yet another embodiment, the memory 220 may include one or more instructions related to controlling the first switch 285 for an electrical connection (or cut off an electrical connection) between the discharge circuit 280 and the ground based on a connected state to the external electronic device 300 (e.g., whether the external electronic device 300 is physically connected and/or communication with the external electronic device 300 is connected through the connector 290). The memory 220 may include one or more instructions related to controlling the second switch 265 for an electrical connection (or cut off an electrical connection) between the connector 290 and the power supply circuit 270 based on the connection state with the external electronic device 300. The memory 220 may include one or more instructions related to controlling the third switch 235 for an electrical connection (or cut off an electrical connection) between the connector 290 and the charging circuit 240 based on whether an external power source is connected.

In various embodiments, the charging OVP circuit 230 may be an overvoltage protection circuit for protecting the charging circuit 240. For example, when an external power source (e.g., travel adapter (TA)) is connected to the connector 290, the charging OVP circuit 230 may prevent an overvoltage from an external power source from being supplied to the charging circuit 240.

In various embodiments, the charging circuit 240 may receive a designated voltage (e.g., about 9 v) from an external power source to charge the battery 250.

In various embodiments, the power supply OVP circuit 260 may be an overvoltage protection circuit for protecting the power supply circuit 270.

In various embodiments, the power supply circuit 270 may supply power to the external electronic device 300 connected through the connector 290. For example, the external electronic device 300 may not include a separate battery. Accordingly, the processor 310 of the external electronic device 300 may receive power supplied from the power supply circuit 270 of the electronic device 200 through the connector 320 to operate (or drive) the external electronic device 300.

In various embodiments, the discharge circuit 280 may discharge a current received from the external electronic device 300.

In various embodiments, the connector 290 of the electronic device 200 and the connector 320 of the external electronic device 300 may contact each other, and accordingly, the electronic device 200 and the external electronic device 300 may be electrically connected. For example, the connector 320 of the external electronic device 300 and the connector 290 of the electronic device 200 may be formed in a physical structure detachable from each other. The connector 320 of the external electronic device 300 and the connector 290 of the electronic device 200 may include a magnet for detachably connecting the connector 320 of the external electronic device 300 and the connector 290 of the electronic device 200 using a magnetic force.

In yet another embodiment, the electronic device 200 may supply power to the external electronic device 300 through a physical connection and communication connection with the external electronic device 300, and the external electronic device 300 may transmit an input signal generated in the input device 330 to the electronic device 200. The connector 320 of the external electronic device 300 and the connector 290 of the electronic device 200 may include, for example, a pogo connector. The pogo connector may include a plurality of terminals. For example, the plurality of terminals may include a first terminal, a second terminal, and a third terminal. The first terminal may be a terminal for supplying power (e.g., voltage supply terminal (e.g., Vcc terminal)) (e.g., power delivery (PD) communication (e.g., terminal for transmitting power to the external electronic device 300 or receiving power from external power (e.g., TA)). The second terminal may be a terminal for receiving information (e.g., identification information) related to the external electronic device 300 from a terminal (e.g., the external electronic device 300) for data transmission (e.g., data input/output) or for transmitting and receiving a signal for communication connection with the external electronic device 300. The third terminal may be a ground terminal connected to the ground. Although the connectors 290 and 320 according to the embodiment of this document have been described as the pogo connector, the disclosure is not limited thereto and may further include various connectors.

In various embodiments, the first switch 285 may control an electrical connection between the discharge circuit 280 and the ground under the control of the processor 210. The second switch 265 may control an electrical connection between the connector 290 (e.g., the first terminal of the connector 290) and the power supply circuit 270 under the control of the processor 210. The third switch 235 may control an electrical connection between the connector 290

(e.g., the first terminal of the connector 290) and the charging circuit 240 under the control of the processor 210.

In FIG. 2 according to various embodiments, it has been described that the first switch 285 is disposed between the discharge circuit 280 and the ground to control an electrical connection between the discharge circuit 280 and the ground, but the disclosure is not limited thereto. For example, the first switch 285 may be disposed between the connector 290 and the discharge circuit 280. In this case, when the first switch 285 is configured to be on (e.g., short state) under the control of the processor 210, the processor 210 controls the electric connection between the discharge circuit 280 and the ground to operate the discharge circuit 280; thus, the first switch 285 may discharge a current received from the external electronic device 300 through the connector 290 for a designated time. As another example, in the case that a resistance value flowing between a source terminal S and a drain terminal D of the first switch 285 is designed to exceed a designated resistance value, the first switch 285 and the discharge circuit 280 may be integrated to discharge a current received from the external electronic device 300 through the connector 290 for a designated time.

In various embodiments, it has been described as having the first switch 285, the second switch 265, and the third switch 235, but the disclosure is not limited thereto. For example, the first switch 285, the second switch 265, and the third switch 235 may be integrated into one switch. In this case, one switch may control an electrical connection between the connector 290 and the charging circuit 240, the power supply circuit 270, or the discharge circuit 280 under the control of the processor 210.

In various embodiments, although not illustrated, the electronic device 200 may further include a display (e.g., the display module 160 of FIG. 1). The display may display a user interface related to a communication connection with the external electronic device 300 and a user interface related to a function performed according to the communication connection with the external electronic device 300 under the control of the processor 210.

In various embodiments, the processor 210 may include, for example, a micro controller unit (MCU), and control a plurality of hardware components connected to the processor 210 by driving an operating system (OS) or embedded software program. The processor 210 may control, for example, a plurality of hardware components according to instructions stored in the memory 220.

In various embodiments, the electronic device 200 may include a first processor and a second processor operable independently of or together with the first processor. The first processor may include a main processor (e.g., the main processor 121 of FIG. 1), for example, a central processer or an application processor. The second processor may include an auxiliary processor (e.g., the auxiliary processor 123 of FIG. 1), for example, a graphics processer, a neural processer (NPU), an image signal processor, a sensor hub processor, or a communication processor. In various embodiments, the first processor and the second processor may be implemented into a single chip (system-on-a-chip (SoC)). However, the disclosure is not limited thereto.

In various embodiments, in the case that the electronic device 200 includes a first processor (e.g., the main processor 121) and a second processor (e.g., the auxiliary processor 123), the second processor may be configured to use lower power than that of the first processor or to be specialized in a designated function.

The processor 210 according to various embodiments may be an auxiliary processor (e.g., second processor) configured to be specialized to control a function of the external electronic device 300. However, the disclosure is not limited thereto, and the processor 210 may be the first processor.

In the following embodiments, it is assumed that the processor 210 is an auxiliary processor (e.g., second processor) configured to be specialized to control a function of the external electronic device 300.

In various embodiments, the processor 210 may detect a connection of the external electronic device 300 through the connector 290. For example, the processor 210 may detect a connection of the external electronic device 300 based on the contact between the connector 320 of the external electronic device 300 and the connector 290 of the electronic device 200. In yet another embodiment, the discharge circuit 280 may be in an activated state by default, and the processor 210 may discharge a current received from the external electronic device 300 through the connector 290 (e.g., the first terminal (e.g., Vcc terminal) of the connector 290) using the discharge circuit 280 for a designated time based on detecting the connection of the external electronic device 300. The designated time may be greater than or equal to a discharge time at which a voltage of the external electronic device 300 becomes less than or equal to a designated voltage. After discharging a current received from the external electronic device 300 for the designated time, the processor 210 may control the first switch 285 to be off (e.g., open state) so that an electrical connection between the discharge circuit 280 and the ground is cut off. The processor 210 may control the second switch 265 to be on (e.g., short circuit) so that the connector 290 (e.g., the first terminal of the connector 290) and the power supply circuit 270 are electrically connected to supply power to the external electronic device 300 through the connector 290 (e.g., the first terminal of the connector 290). The external electronic device 300 may be driven (or operated) using power received through the connector 320 (e.g., the first terminal of the connector 320).

In yet another embodiment, the processor 210 may identify whether communication with the external electronic device 300 is connected. For example, the processor 210 may transmit a signal for requesting a communication connection to the external electronic device 300 through the connector 290 (e.g., the second terminal (e.g., data input/output terminal) of the connector 290). When a response signal to the signal for requesting a communication connection is received from the external electronic device 300, the processor 210 may identify that communication with the external electronic device 300 is connected, and perform communication with the external electronic device 300. When a response signal to the signal for requesting a communication connection is not received from the external electronic device 300, the processor 210 may identify that communication with the external electronic device 300 is not connected, control the second switch 265 to be off (e.g., open state) so that an electrical connection between the connector 290 (e.g., the first terminal of the connector 290) and the power supply circuit 270 is cut off, and control the first switch 285 to be on (e.g., short state) so that the discharge circuit 280 and the ground are electrically connected. The processor 210 may discharge a current of the external electronic device 300 received through the connector 290 (e.g., the first terminal of the connector 290) using the discharge circuit 280 for a designated time in an activated state.

In various embodiments, in the case that the discharge circuit 280 is configured to a deactivated state by default, the processor 210 may control the second switch 265 to be on (e.g., short state) so that the connector 290 (e.g., the first terminal of the connector 290) and the power supply circuit 270 are electrically connected to supply power to the external electronic device 300 based on detection of a connection of the external electronic device 300. The processor 210 may transmit a signal for requesting a communication connection to the external electronic device 300 through the connector 290 (e.g., the second terminal (e.g., data input/output terminal) of the connector 290). When a response signal to the signal for requesting a communication connection is received from the external electronic device 300, the processor 210 may identify that communication with the external electronic device 300 is connected, and perform communication with the external electronic device 300. When a response signal to the signal for requesting a communication connection is not received from the external electronic device 300, the processor 210 may identify that communication with the external electronic device 300 is not connected, control the second switch 265 to be off (e.g., open state) so that an electrical connection between the connector 290 (e.g., the first terminal of the connector 290) and the power supply circuit 270 is cut off, and control the first switch 285 to be on (e.g., short state) so that the discharge circuit 280 and the ground are electrically connected. The processor 210 may discharge a current of the external electronic device 300 received through the connector 290 (e.g., the first terminal of the connector 290) using the discharge circuit 280 for a designated time. After discharging for a designated time, the processor 210 may control the first switch 285 to be off (e.g., open state) so that an electrical connection between the discharge circuit 280 and the ground is cut off. The electronic device 200 may terminate (or stop) an operation of discharging a current of the external electronic device 300 using the discharge circuit 280 based on the electrical connection between the discharge circuit 280 and the ground being cut off. The processor 210 may control the second switch 265 to electrically connect the connector 290 (e.g., the first terminal of the connector 290) and the power supply circuit 270 to supply power to the external electronic device 300.

The electronic device 200 according to various embodiments may include a connector 290, a power supply circuit 270, a discharge circuit 280, a first switch 285 for controlling an electrical connection between the discharge circuit 280 and a ground (e.g., a ground 555 of FIG. 5E), a second switch 265 for controlling an electrical connection between the connector 290 and the power supply circuit 270, and a processor 210 operatively connected to the connector 290, the power supply circuit 270, the discharge circuit 280, the first switch 285, and the second switch 265, and in a state in which the discharge circuit 280 is activated, the processor 210 may be configured to detect a connection of the external electronic device 300 through the connector 290, to perform a first discharge of discharging a current of the connected external electronic device 300 using the discharge circuit 280 for a designated time based on the connection of the external electronic device 300, to control the first switch 285 to cut off the electrical connection between the discharge circuit 280 and the ground 555 after performing first discharge, to control the second switch 265 to electrically connect the connector 290 and the power supply circuit 270 to supply designated power to the external electronic device through the connector 290, and to perform communication with the external electronic device 300 based on a communication connection with the external electronic device 300.

In various embodiments, the processor 210 may be configured to transmit a signal for requesting a communication connection through the connector 290 to the external electronic device 300 while supplying the designated power to the external electronic device 300 through the connector 290, to determine that communication with the external electronic device 300 is connected when a response signal to a signal requesting a communication connection is received from the external electronic device 300, and to determine that communication with the external electronic device 300 is not connected when a response signal to a signal for requesting a communication connection is not received from the external electronic device 300.

In various embodiments, when it is determined that communication with the external electronic device 300 is not connected, the processor 210 may be configured to control the second switch 265 to cut off the electrical connection between the connector 290 and the power supply circuit 270 to stop power supplied to the external electronic device 300, to control the first switch 285 to electrically connect the discharge circuit 280 and the ground 555, to perform a second discharging of discharging a current of the connected external electronic device 300 using the discharge circuit 280 for the designated time, to control the first switch 285 to cut off the electrical connection between the discharge circuit 280 and the ground 555 after performing the second discharging, and to control the second switch 265 to electrically connect the connector 290 and the power supply circuit 270 to supply the designated power to the external electronic device 300.

In various embodiments, the first switch 285 may be disposed between the discharge circuit 280 and the ground 555.

In various embodiments, the designated time may be configured to be greater than or equal to a discharge time at which a voltage of the external electronic device 300 becomes less than or equal to a designated voltage.

In various embodiments, the processor 210 may be configured to perform a first discharge by discharging a current received from the external electronic device 300 for the designated time period through the connector 290 so that a voltage of the external electronic device 300 becomes less than or equal to a designated voltage using the discharge circuit 280.

The electronic device 200 according to various embodiments may further include a charging circuit 240 and a third switch 235 for controlling an electrical connection between the connector 290 and the charging circuit 240, and when an external power source is connected to the connector 290, the processor 210 may control the third switch 235 to electrically connect the connector 290 and the charging circuit 240, and control the first switch 285 to cut off the electrical connection between the discharge circuit 280 and the ground 555 based on that the connector 290 and the charging circuit 240 are electrically connected, thereby controlling to deactivate the discharge circuit 280 in the activated state.

In various embodiments, the processor 210 may be configured to receive information related to the external electronic device 300 from the external electronic device 300 through the connector 290 based on the connection of the external electronic device 300, and the information related to the external electronic device 300 may include identification information of the external electronic device 300.

In various embodiments, when a connection of the external electronic device 300 is detected through the connector 290 in a state in which the discharge circuit 280 is deactivated, the processor 210 may be configured to control the second switch 265 to electrically connect the connector 290 and the power supply circuit 270 to supply the designated power to the external electronic device 300, to control the second switch 265 to cut off the electrical connection between the connector 290 and the power supply circuit 270 based on a failure of a communication connection with the external electronic device 300, to control the first switch 285 to electrically connect the discharge circuit 280 and the ground 555, to discharge a current of the external electronic device 300 received through the connector 290 using the discharge circuit 280 for the designated time, to control the first switch 285 to cut off the electrical connection between the discharge circuit 280 and the ground 555, and to control the second switch 265 to electrically connect the connector 290 and the power supply circuit 270 to supply the designated power to the external electronic device 300.

In various embodiments, the processor 210 may be configured to discharge a current received from the external electronic device 300 for the designated time through the connector 290 so that a voltage of the external electronic device 300 becomes less than or equal to a designated voltage using the discharge circuit 280.

Figure 4:
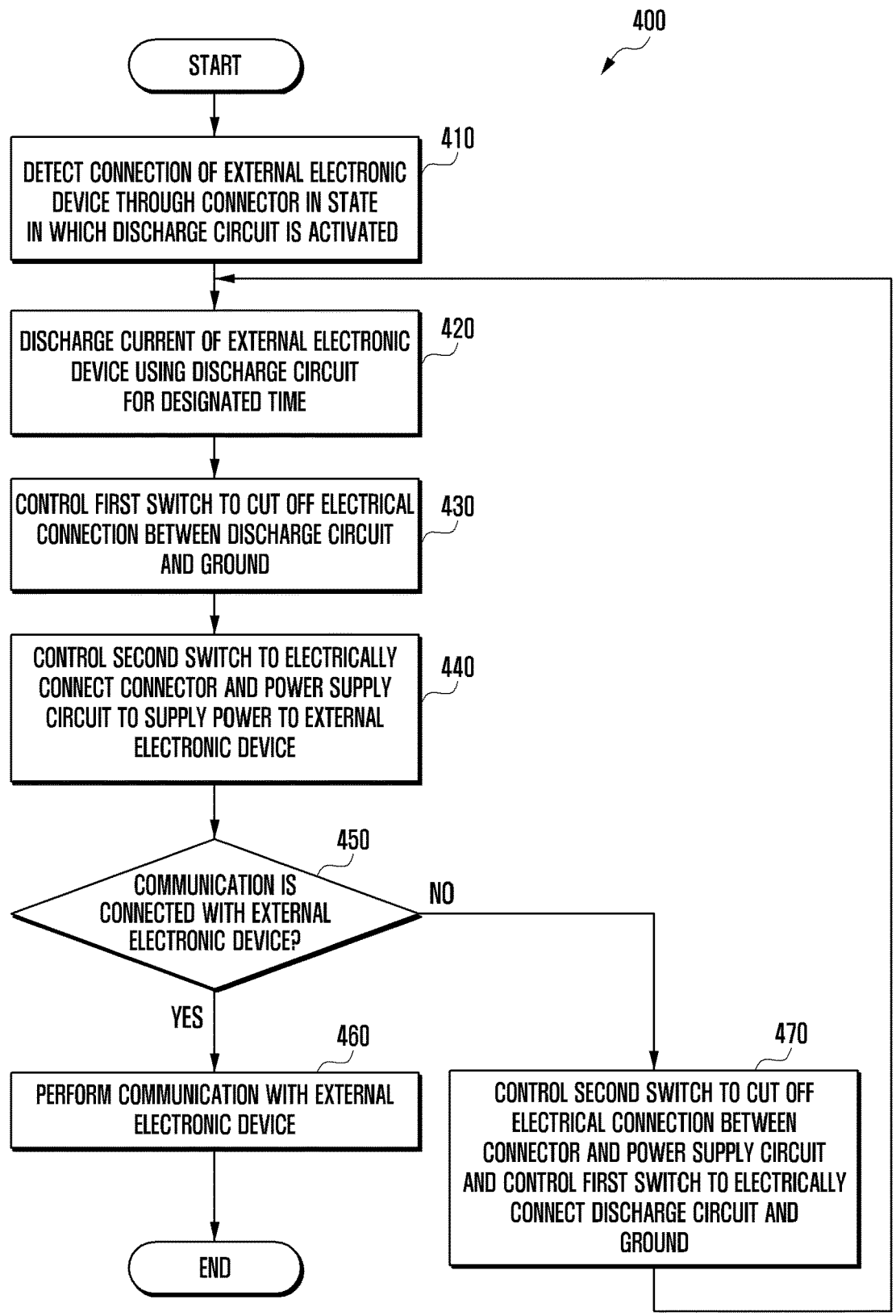
FIG. 4 is a flowchart illustrating a method of controlling discharge of an external electronic device in the case that the external electronic device is connected to an electronic device according to an embodiment of the disclosure.

FIG. 4 is a flowchart illustrating a method of controlling discharge of an external electronic device in the case that the external electronic device is connected to an electronic device according to an embodiment of the disclosure.

Referring to FIG. 4 according to various embodiments, the discharge circuit (e.g., the discharge circuit 280 of FIG. 3) of the electronic device (e.g., the electronic device 200 of FIG. 2) may be in an activated state by default. FIG. 4 is a diagram illustrating a method of controlling discharge of the external electronic device 300 in an activated state in which the discharge circuit 280 is configured by default.

Referring to FIG. 4, in a method 400, in operation 410, the processor (e.g., the processor 210 of FIG. 3) of the electronic device 200 may detect a connection of the external electronic device (e.g., the external electronic device 300 of FIG. 2) through the connector (e.g., the connector 290 of FIG. 3) in a state in which the discharge circuit 280 is activated. For example, the processor 210 may detect a connection of the external electronic device 300 based on the contact between the connector 320 of the external electronic device 300 and the connector 290 of the electronic device 200. In another embodiment, the connector 290 of the electronic device 200 and the connector 320 of the external electronic device 300 may be pogo connectors. The connectors 290 and 320 may include a plurality of terminals. The electronic device 200 may supply power to the external electronic device 300 through a plurality of terminals of the connectors 290 and 320 and/or transmit and receive data for a communication connection with the external electronic device 300.

In yet another embodiment, in operation 420, the processor 210 may discharge a current of the external electronic device 300 using the discharge circuit 280 for a designated time based on detecting the connection of the external electronic device 300.

In various embodiments, the designated time may be greater than or equal to a discharge time at which a voltage of the external electronic device 300 becomes less than or equal to a designated voltage.

As described above, in FIG. 4 according to various embodiments, the discharge circuit 280 of the electronic device 200 may be in an activated state by default. For example, the first switch (e.g., the first switch 285 of FIG. 3) may be configured to an on state (e.g., short state) so that the discharge circuit 280 and the ground are electrically connected. As the first switch 285 is configured to an on state, the discharge circuit 280 may be in an activated state. When the connection of the external electronic device 300 is identified, the processor 210 may discharge a current received from the external electronic device 300 for a designated time through the connector 290 (e.g., the first terminal (e.g., Vcc terminal) of the connector 290) using the discharge circuit 280 in the activated state.

In yet another embodiment, in operation 430, the processor 210 may control the first switch 285 to cut off the electrical connection between the discharge circuit 280 and the ground. For example, the processor 210 may control the first switch 285 to be off (e.g., open state) to cut off the electrical connection between the discharge circuit 280 and the ground. The electronic device 200 may terminate (or stop) an operation of discharging a current of the external electronic device 300 using the discharge circuit 280 based on the electrical connection between the discharge circuit 280 and the ground being cut off.

In yet another embodiment, in operation 440, the processor 210 may control the second switch (e.g., the second switch 265 of FIG. 3) to electrically connect the connector 290 and the power supply circuit 270 to supply power to the external electronic device 300. For example, the processor 210 may control the second switch 265 to be on (e.g., short state) to enable the connector 290 (e.g., the first terminal of the connector 290) and the power supply circuit 270 to be electrically connected. As the connector 290 (e.g., the first terminal of the connector 290) and the power supply circuit 270 are electrically connected, the processor 210 may transmit power supplied from the power supply circuit 270 to the external electronic device 300 through the connector 290 (e.g., the first terminal of the connector 290). The external electronic device 300 may be driven (or operated) using power received through the connector 320 (e.g., the first terminal of the connector 320).

In yet another embodiment, in operation 450, the processor 210 may identify whether communication is connected with the external electronic device 300. For example, the processor 210 may transmit a signal for requesting a communication connection to the external electronic device 300 through the connector 290 (e.g., the second terminal (e.g., data input/output terminal) of the connector 290). The processor 210 may identify whether communication is connected with the external electronic device 300 based on whether a response signal to a signal for requesting a communication connection is received from the external electronic device 300.

In yet another embodiment, when a response signal to a signal for requesting a communication connection is received from the external electronic device 300, the processor 210 may identify that communication with the external electronic device 300 is connected (e.g., identify (or determine) that communication connection is successful). In the case that communication is connected with the external electronic device 300 (e.g., YES in operation 450), in operation 460, the processor 210 may perform communication with the external electronic device 300. For example, the processor 210 may receive an input signal input from an input device (e.g., the input device 330 of FIG. 3) of the external electronic device 300 from the external electronic device 300 through the connector 290 (e.g., the second terminal of the connector 290).

In yet another embodiment, when a response signal to a signal for requesting a communication connection is not received from the external electronic device 300, the processor 210 may identify that communication with the external electronic device 300 is not connected (e.g., identify (or determine) that a communication connection has failed). In the case that communication with the external electronic device 300 is not connected (e.g., NO in operation 450), in operation 470, the processor 210 may control the second switch 265 (e.g., control the second switch 265 to be off (e.g., open state)) so that an electrical connection between the connector 290 (e.g., the first terminal of the connector 290) and the power supply circuit 270 is cut off, and control the first switch 285 (e.g., control the first switch 285 to be on (e.g., short state) so that the discharge circuit 280 and the ground are electrically connected. As the processor 210 controls the first switch 285 to be on, the discharge circuit 280 may be in an activated state. The process branches to operation 420 and the processor 210 may discharge a current of the external electronic device 300 received through the connector 290 (e.g., the first terminal of the connector 290) using the discharge circuit 280 in the activated state for a designated time.

In various embodiments, after controlling the first switch 285 to cut off the electrical connection between the discharge circuit 280 and the ground in operation 430, it has been described as controlling the second switch 265 to electrically connect the connector 290 (e.g., the first terminal of the connector 290) and the power supply circuit 270 in operation 440, but the disclosure is not limited thereto. For example, operations 430 and 440 may be performed in parallel.

In various embodiments, it has been described that a current that may be received from the external electronic device 300 is discharged for a designated time using the discharge circuit 280, but the disclosure is not limited thereto. For example, the electronic device 200 may receive information on a voltage or a current from the external electronic device 300. When it is identified that a residual voltage or a residual current of the external electronic device 300 is less than or equal to a designated voltage or current based on information on a voltage or a current of the external electronic device 300, the electronic device 200 may stop an operation of discharging the current received from the external electronic device 300 using the discharge circuit 280.

Referring to FIG. 4 according to various embodiments, the processor 210 of the electronic device 200 may enable a voltage of the external electronic device 300 to be equal to or less than a designated voltage by discharging a current received from the external electronic device 300 using the discharge circuit 280 based on the connection with the external electronic device 300 and by re-performing an operation of discharging a current received from the external electronic device 300 using the discharge circuit 280 in the case that communication is not connected with the external electronic device 300. In a state in which a voltage of the external electronic device 300 is equal to or less than a designated voltage, the processor 210 of the electronic device 200 may perform a communication connection with the external electronic device 300 to prevent a malfunction of the external electronic device 300.

FIGS. 5A, 5B, 5C, and 5D are diagrams illustrating a method of controlling discharge of an external electronic device in the case that the external electronic device is connected to an electronic device according to various embodiments of the disclosure.

FIGS. 5A, 5B, 5C, and 5D according to various embodiments are diagrams illustrating a method of controlling discharge of the external electronic device 300 according to the above-described embodiment of FIG. 4.

In various embodiments, the electronic device 200 may include a processor 210, a charging circuit 240, a battery 250, a power supply circuit 270, a discharge circuit 280, and/or a connector 290. The electronic device 200 may include a first switch 285 for controlling an electrical connection between the discharge circuit 280 and the ground, a second switch 265 for controlling an electrical connection between the connector 290 and the power supply circuit 270, and a third switch 235 for controlling an electrical connection between the connector 290 and the charging circuit 240. Although not illustrated, the electronic device 200 may further include a charging OVP circuit 230 and a power supply OVP circuit 260. The external electronic device 300 may include a processor 310 and/or a connector 320.

Figure 5A:
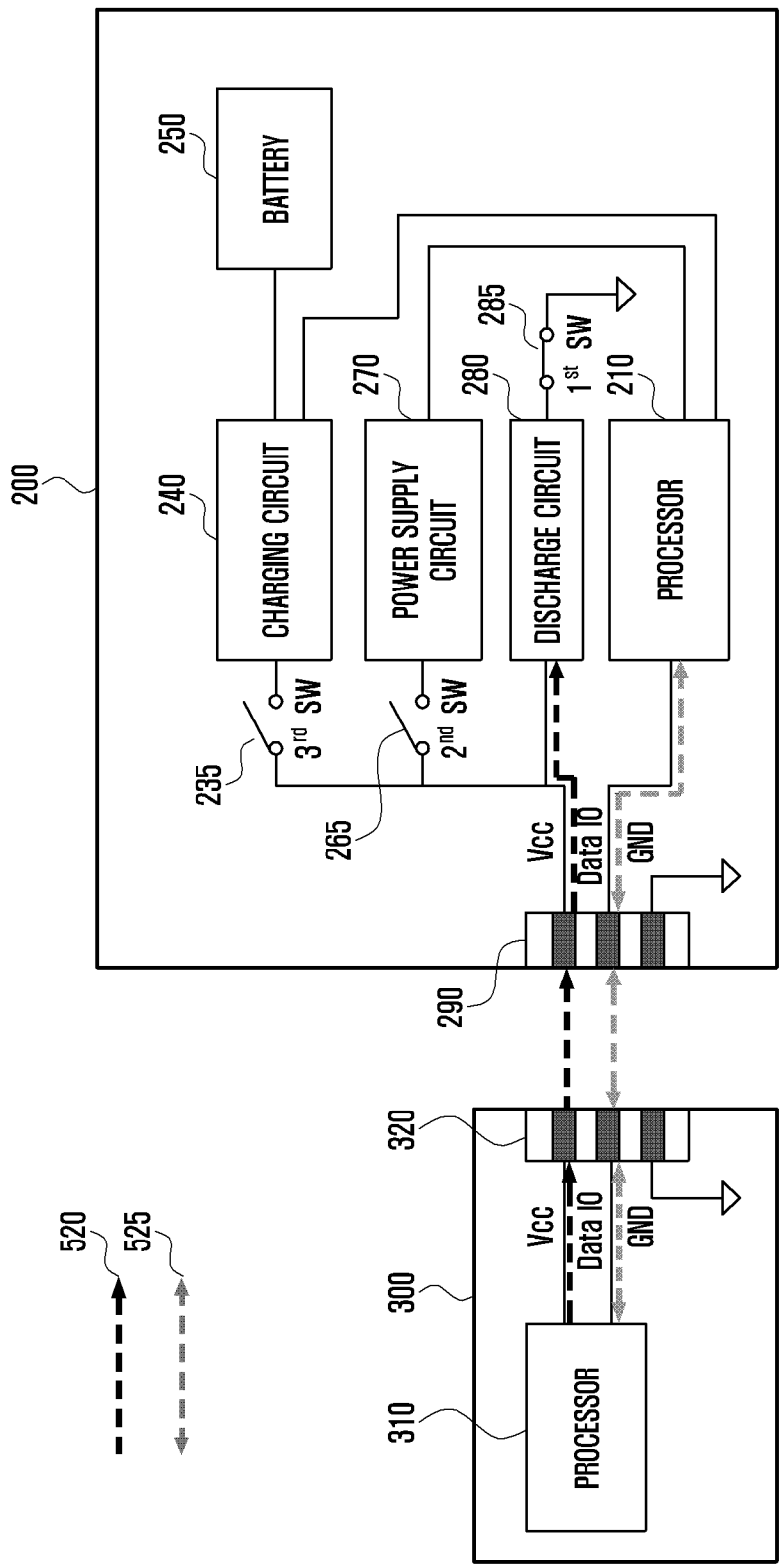
FIGS. 5A, 5B, 5C, and 5D are diagrams illustrating a method of controlling discharge of an external electronic device in the case that the external electronic device is connected to an electronic device according to various embodiments of the disclosure.

Referring to FIG. 5A, the processor 210 of the electronic device 200 may identify a connection (e.g., physical connection) with the external electronic device 300 based on the contact between the connector 290 of the electronic device 200 and the connector 320 of the external electronic device 300. When a connection with the external electronic device 300 is identified, the processor 210 of the electronic device 200 may transmit and receive (525) data to and from the processor 310 of the external electronic device 300 through the connector 290 (e.g., the second terminal (e.g., data input/output terminal) of the connector 290). For example, the processor 210 of the electronic device 200 may receive information (e.g., identification information) related to the external electronic device 300 from the external electronic device 300.

In various embodiments, the first switch 285 may be configured to an on state (e.g., short state) so that the discharge circuit 280 and the ground are electrically connected. Accordingly, when a connection of the external electronic device 300 is identified, the processor 210 of the electronic device 200 may perform first discharge by discharging a current 520 of the external electronic device 300 received through the connector 290 (e.g., the first terminal (e.g., Vcc terminal) of the connector 290) using the discharge circuit 280 for a designated time.

In various embodiments, the designated time may be greater than or equal to a discharge time at which a voltage of the external electronic device 300 becomes less than or equal to a designated voltage.

Figure 5B:
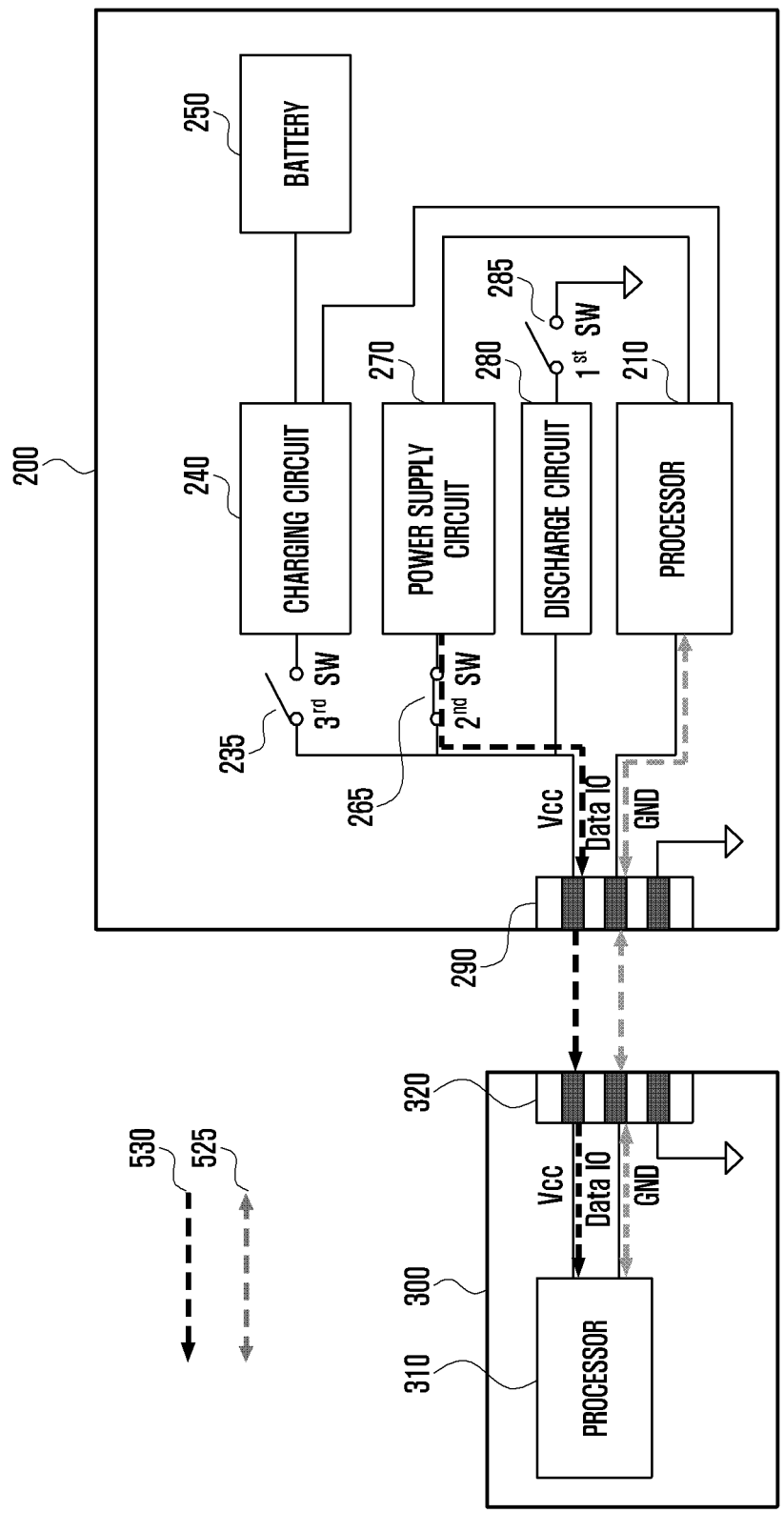

Referring to FIG. 5B, after performing first discharge, the processor 210 of the electronic device 200 may control the first switch 285 to be off (e.g., open state) so as to cut off the electrical connection between the discharge circuit 280 and the ground. As the first switch 285 is controlled to be off (e.g., open state), the processor 210 of the electronic device 200 may stop (or terminate) an operation of discharging a current of the external electronic device 300. The processor 210 of the electronic device 200 may control the first switch 285 to be off (e.g., open state), and then control the second switch 265 to electrically connect the connector 290 (e.g., the first terminal of the connector 290) and the power supply circuit 270. For example, the processor 210 of the electronic device 200 may control the second switch 265 to be on (e.g., short state) so that the connector 290 (e.g., the first terminal of the connector 290) and the power supply circuit 270 are electrically connected. The processor 210 of the electronic device 200 may transmit a designated power source (or designated power) 530 supplied through the power supply circuit 270 to the external electronic device 300 through the connector 290 (e.g., the first terminal of the connector 290)

based on the electrical connection between the connector 290 (e.g., the first terminal of the connector 290) and the power supply circuit 270.

In various embodiments, the external electronic device 300 may not include a battery, and may be driven (or operated) using a designated power source (e.g., designated power) received from the electronic device 200 through the connector 320 (e.g., the first terminal of the connector 320).

In an embodiment, the processor 210 of the electronic device 200 may identify whether communication with the external electronic device 300 is connected while transmitting a designated power source (or designated power) 530 to the external electronic device 300 through the connector 290 (e.g., the first terminal of the connector 290). For example, the processor 210 of the electronic device 200 may transmit a signal for requesting a communication connection to the external electronic device 300 through the connector 290 (e.g., the second terminal of the connector 290). The processor 210 of the electronic device 200 may identify whether communication with the external electronic device 300 is connected based on whether a response signal is received from the external electronic device 300 in response to the signal for requesting a communication connection.

For example, when a response signal to a signal for requesting a communication connection is received from the external electronic device 300 through the connector 290 (e.g., the second terminal of the connector 290), the processor 210 of the electronic device 200 may identify that communication with the external electronic device 300 is connected, and perform communication with the external electronic device 300. For example, the processor 210 may receive an input signal input from an input device (e.g., the input device 330 of FIG. 3) of the external electronic device 300 from the external electronic device 300 through the connector 290 (e.g., the second terminal of the connector 290).

For another example, when a response signal to a signal for requesting a communication connection is not received from the external electronic device 300, the processor 210 of the electronic device 200 may identify that communication with the external electronic device 300 is not connected. For example, a case in which a response signal to a signal for requesting a communication connection is not received from the external electronic device 300 may include a case where power of the external electronic device 300 is turned on/off in a state in which the external electronic device 300 is connected through the connector 290, a case in which firmware of the electronic device 200 or the external electronic device 300 is updated, or a case in which a malfunction occurs in the electronic device 200 or the external electronic device 300.

Figure 5C:
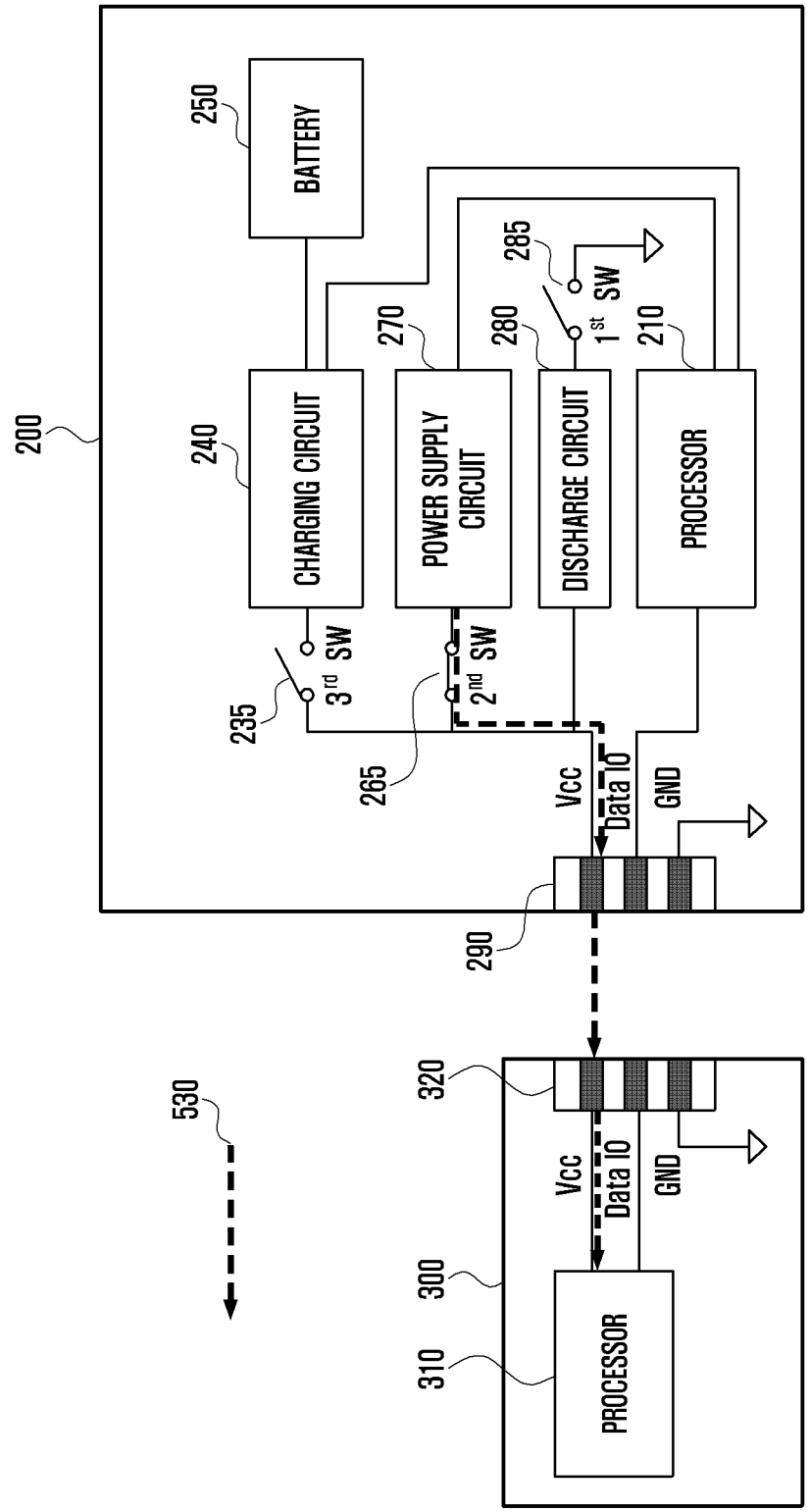
Figure 5D:
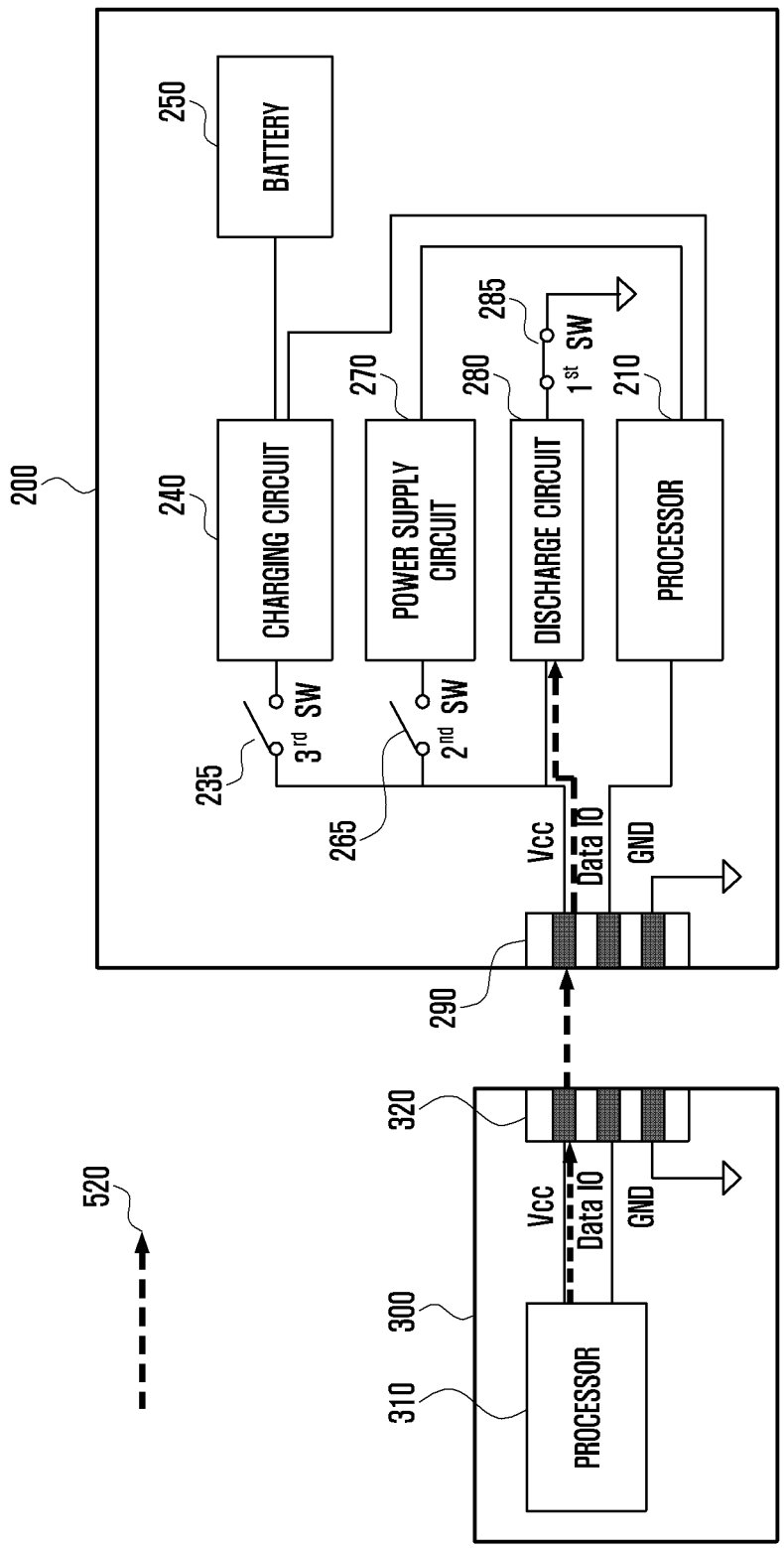

Referring to FIG. 5C, as communication with the external electronic device 300 is not connected, operation of transmitting and receiving (525) data through the connector 290 (e.g., the second terminal of the connector 290) may not be performed. In this case, referring to FIG. 5D, the processor 210 of the electronic device 200 may control the second switch 265 to be off (e.g., open state) so that an electrical connection between the connector 290 (e.g., the first terminal of the connector 290) and the power supply circuit 270 is cut off. As the second switch 265 is controlled to be off (e.g., open state), an operation of supplying power from the power supply circuit 270 to the external electronic device 300 may be stopped. After controlling the second switch 265 to be off, the processor 210 of the electronic device 200 may control the first switch 285 to be on (e.g., short state) so that the discharge circuit 280 and the ground are electrically connected. The electronic device 200 may perform a second discharge by discharging the current 520 received from the external electronic device 300 through the connector 290 (e.g., the first terminal of the connector 290) using the discharge circuit 280 for a designated time. After performing the second discharge, the processor 210 of the electronic device 200 may control the first switch 285 to be off (e.g., open state) so that an electrical connection between the discharge circuit 280 and the ground is cut off and control the second switch 265 to be on (e.g., short state) so that the connector 290 (e.g., the first terminal of the connector 290) of FIG. 5B and the power supply circuit 270 are electrically connected to transmit power supplied from the power supply circuit 270 to the external electronic device 300 through the connector 290 (e.g., the first terminal of the connector 290).

In various embodiments, in the case that communication with the external electronic device 300 is not connected, the processor 210 of the electronic device 200 may cut off the electrical connection between the connector 290 (e.g., the first terminal of the connector 290) and the power supply circuit, discharge a current of the external electronic device 300 using the discharge circuit 280, and then control the second switch 265 to electrically connect the connector 290 (e.g., the first terminal of the connector 290) and the power supply circuit 270 to reset the external electronic device 300. After resetting the external electronic device 300, the processor 210 of the electronic device 200 may again perform a communication connection with the external electronic device 300.

In various embodiments, the operation of performing first discharge and second discharge may be an operation of performing a voltage of the external electronic device 300 to be less than or equal to a designated voltage. The processor 210 of the electronic device 200 attempts a communication connection with the external electronic device 300 in a state in which a voltage of the external electronic device 300 becomes less than or equal to a designated voltage by performing the first discharge and/or the second discharge, thereby smoothly performing a connection with the external electronic device 300 without a malfunction.

In various embodiments, after performing first discharge (or second discharge), although it has been described that the first switch 285 is controlled to cut off the electrical connection between the discharge circuit 280 and the ground, and that the second switch 265 is controlled to electrically connect the connector 290 (e.g., the first terminal of the connector 290) and the power supply circuit 270, the disclosure is not limited thereto. For example, after performing the first discharge (or the second discharge), an operation of controlling the first switch 285 to cut off the electrical connection between the discharge circuit 280 and the ground and an operation of controlling the second switch 265 to electrically connect the connector 290 (e.g., the first terminal of the connector 290) and the power supply circuit 270 may be performed in parallel.

In various embodiments, although not illustrated, when an external power source (e.g., travel adapter (TA)) is connected to the connector 290, the processor 210 of the electronic device 200 may control the third switch 235 to be on (e.g., short state) so that the connector 290 and the charging circuit 240 are electrically connected. The processor 210 of the electronic device 200 may charge the battery 250 through the charging circuit 240 using power received from an external power source. In this case, the processor 210 of the electronic device 200 may control the first switch 285 to be off (e.g., open state) so that an electrical connection between the discharge circuit 280 and the ground is cut off.

Figure 5E:
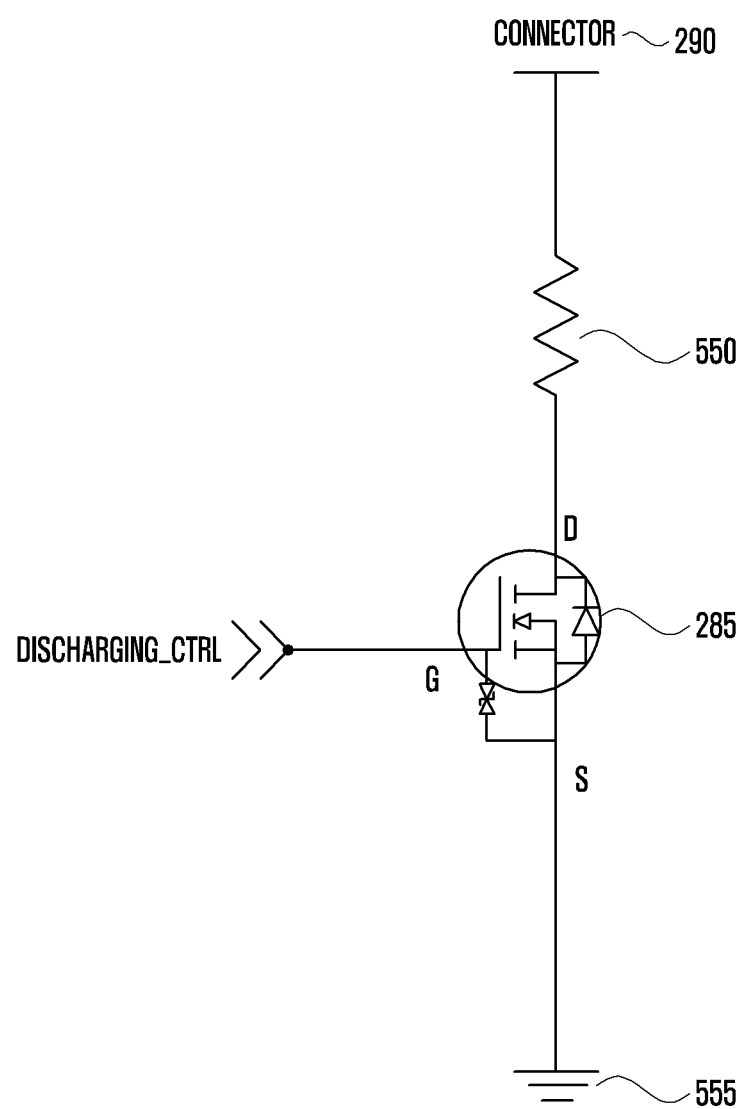
FIG. 5E is a diagram illustrating a first switch of an electronic device according to an embodiment of the disclosure.

FIG. 5E is a diagram illustrating a first switch 285 of the electronic device 200 according to an embodiment of the disclosure.

Referring to FIG. 5E, the first switch 285 may be disposed between a discharge resistor 550 (e.g., the discharge circuit 280) and the ground 555 to control an electrical connection between the discharge circuit 280 and the ground 555. The first switch 285 may be a field effect transistor having a source terminal S, a drain terminal D, and a gate terminal G.

In an embodiment, in the case that the processor 210 of the electronic device 200 controls the first switch 285 to be on (e.g., control to a short state) in the embodiments of FIGS. 4 and 5A to 5D, a discharge current may flow between the source terminal S and the drain terminal D, and accordingly, the processor 210 of the electronic device 200 may discharge a current received from the external electronic device 300 through the discharge resistor 550 (e.g., the discharge circuit 280). A value of the discharge resistor 550 may be adjustable based on a discharge waveform.

Referring to FIG. 5E according to various embodiments, although it has been described that the first switch 285 is disposed between the discharge resistor 550 (e.g., the discharge circuit 280) and the ground 555, the disclosure is not limited thereto. For example, in another embodiment, the first switch 285 may be disposed between the connector 290 and the discharge resistor 550 (e.g., the discharge circuit 280). In this case, when the first switch 285 is configured to be on (e.g., short state) under the control of the processor 210 of the electronic device 200, by controlling an electrical connection between the discharge resistor 550 (e.g., the discharge circuit 280) and the ground 555, the processor 210 may discharge a current received from the external electronic device 300 through the discharge resistor 550 (e.g., the discharge circuit 280).

In another embodiment, in the case that a resistance value flowing between the source terminal S and the drain terminal D of the first switch 285 is designed to exceed a designated resistance value, the first switch 285 and the discharge resistor 550 (e.g., the discharge circuit 280) may be integrated.

Figure 6:
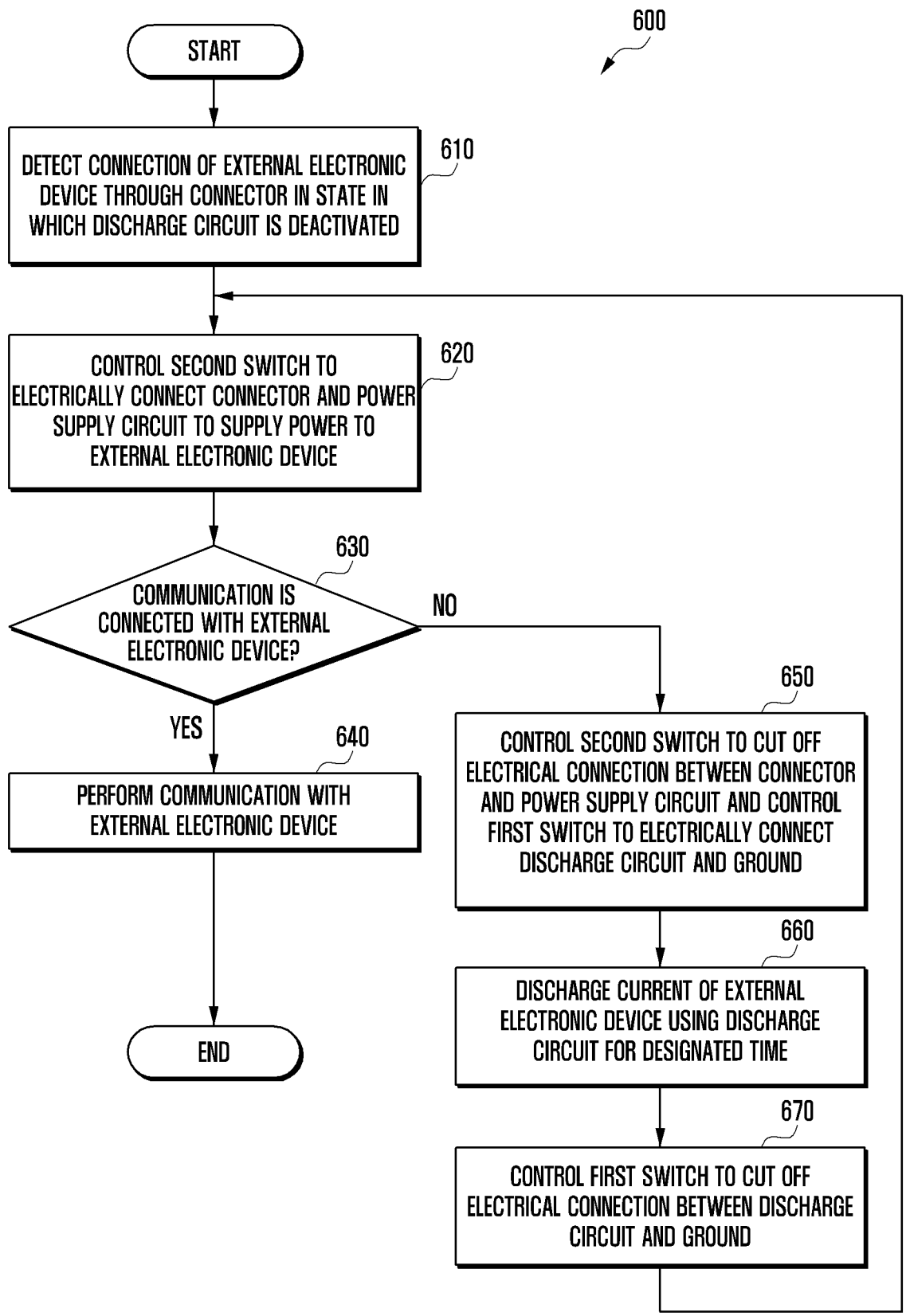
FIG. 6 is a flowchart illustrating a method of controlling discharge of an external electronic device in the case that the external electronic device is connected to an electronic device according to an embodiment of the disclosure.

FIG. 6 is a flowchart illustrating a method of controlling discharge of an external electronic device in the case that the external electronic device is connected to an electronic device according to an embodiment of the disclosure.

Referring to FIG. 6 according to various embodiments, the discharge circuit (e.g., the discharge circuit 280 of FIG. 3) of the electronic device (e.g., the electronic device 200 of FIG. 2) may be in a deactivated state by default. FIG. 6 is a diagram illustrating a method of controlling discharge of the external electronic device 300 in a state in which the discharge circuit 280 is configured to a deactivated state by default.

With reference to FIG. 6, in a method 600, in operation 610, the processor (e.g., the processor 210 of FIG. 3) of the electronic device 200 may detect a connection of the external electronic device (e.g., the external electronic device 300 of FIG. 2) through the connector (e.g., the connector 290 of FIG. 3) in a state in which the discharge circuit 280 is deactivated. For example, the processor 210 may detect a connection of the external electronic device 300 based on the contact between the connector 320 of the external electronic device 300 and the connector 290 of the electronic device 200.

In an embodiment, in operation 620, the processor 210 may control the second switch (e.g., the second switch 265 of FIG. 3) to electrically connect the connector 290 (e.g., a first terminal (e.g., Vcc terminal) of the connector 290) and the power supply circuit (e.g., the power supply circuit 270 of FIG. 3) based on detecting a connection of the external electronic device 300, thereby supplying power to the external electronic device 300. For example, the processor 210 may control the second switch 265 to be on (e.g., short state) so that the connector 290 (e.g., the first terminal of the connector 290) and the power supply circuit 270 are electrically connected. As the connector 290 (e.g., the first terminal of the connector 290) and the power supply circuit 270 are electrically connected, the processor 210 may transmit power supplied from the power supply circuit 270 to the external electronic device 300 through the connector 290 (e.g., the first terminal of the connector 290).

In another embodiment, in operation 630, the processor 210 may identify whether communication is connected with the external electronic device 300. For example, the processor 210 may transmit a signal for requesting a communication connection to the external electronic device 300 through the connector 290 (e.g., the second terminal (e.g., data input/output terminal) of the connector 290). The processor 210 may identify whether communication with the external electronic device 300 is connected based on whether a response signal to a signal for requesting a communication connection is received from the external electronic device 300.

In yet another embodiment, when a response signal to a signal for requesting a communication connection is received from the external electronic device 300, the processor 210 may identify (or determine) that communication with the external electronic device 300 is connected. In the case that communication with the external electronic device 300 is connected (e.g., YES in operation 630), in operation 640, the processor 210 may perform communication with the external electronic device 300.

In yet another embodiment, when a response signal to a signal requesting a communication connection is not received from the external electronic device 300, the processor 210 may identify (or determine) that communication with the external electronic device 300 is not connected. In the case that communication with the external electronic device 300 is not connected (e.g., NO in operation 630), in operation 650, the processor 210 may control the second switch 265 (e.g., control the second switch 265 to be off (e.g., open state)) so that the electrical connection between the connector 290 (e.g., the first terminal of the connector 290) and the power supply circuit 270 is cut off and control the first switch 285 (e.g., control the first switch 285 to be on (e.g., short state) so that the discharge circuit 280 and the ground are electrically connected. As the processor 210 controls the first switch 285 to be on, the discharge circuit 280 may be in an activated state. In operation 660, the processor 210 may discharge a current of the external electronic device 300 received through the connector 290 (e.g., the first terminal of the connector 290) using the discharge circuit 280 for a designated time. In various embodiments, the designated time may be greater than or equal to a discharge time at which a voltage of the external electronic device 300 becomes less than or equal to a designated voltage. After discharging for a designated time, in operation 670, the processor 210 may control the first switch 285 to cut off the electrical connection between the discharge circuit 280 and the ground. For example, the processor 210 may control the first switch 285 to be off (e.g., open state) to cut off the electrical connection between the discharge circuit 280 and the ground. The electronic device 200 may terminate (or stop) operation of discharging a current of the external electronic device 300 using the discharge circuit 280 based on the electrical connection between the discharge circuit 280 and the ground being cut off.

In yet another embodiment, the process may branch to operation 620 and the processor 210 may control the second switch 265 to electrically connect the connector 290 (e.g., the first terminal of the connector 290) and the power supply circuit (e.g., the power supply circuit 270 of FIG. 3), thereby supplying power to the external electronic device 300.

In various embodiments, as the connector 290 (e.g., the first terminal of the connector 290) and the power supply circuit 270 are electrically connected, while power is supplied to the external electronic device 300 through the power supply circuit 270, in the case that communication with the external electronic device 300 is not connected, the processor 210 may cut off the electrical connection between the connector 290 (e.g., the first terminal of the connector 290) and the power supply circuit 270, discharge a current received from the external electronic device 300 using the discharge circuit 280, and then control the connector 290 (e.g., the first terminal of the connector 290) and the power supply circuit 270 to be electrically connected to reset the external electronic device 300. After resetting the external electronic device 300, the processor 210 of the electronic device 200 may perform a communication connection with the external electronic device 300. In yet another embodiment, a voltage of the external electronic device 300 may be configured to be less than or equal to a designated voltage through an operation of discharging a current received from the external electronic device 300. The processor 210 of the electronic device 200 may rapidly discharge a current of the external electronic device 300 using the discharge circuit 280 before a reconnection of the external electronic device 300 is detected to enable a voltage of the external electronic device 300 to be equal to or less than a designated voltage. As a communication connection with the external electronic device 300 is attempted in a state in which the voltage is equal to or less than a designated voltage, a communication connection between the electronic device 200 and the external electronic device 300 may be smoothly performed without a malfunction.

In various embodiments, although it has been described that the first switch 285 is controlled to cut off the electrical connection between the discharge circuit 280 and the ground after performing the discharge in operation 660, and the second switch 265 is controlled to electrically connect the connector 290 (e.g., the first terminal of the connector 290) of operation 620 and the power supply circuit 270, the disclosure is not limited thereto. For example, operations 660 and 620 may be performed in parallel.

Figure 7A:
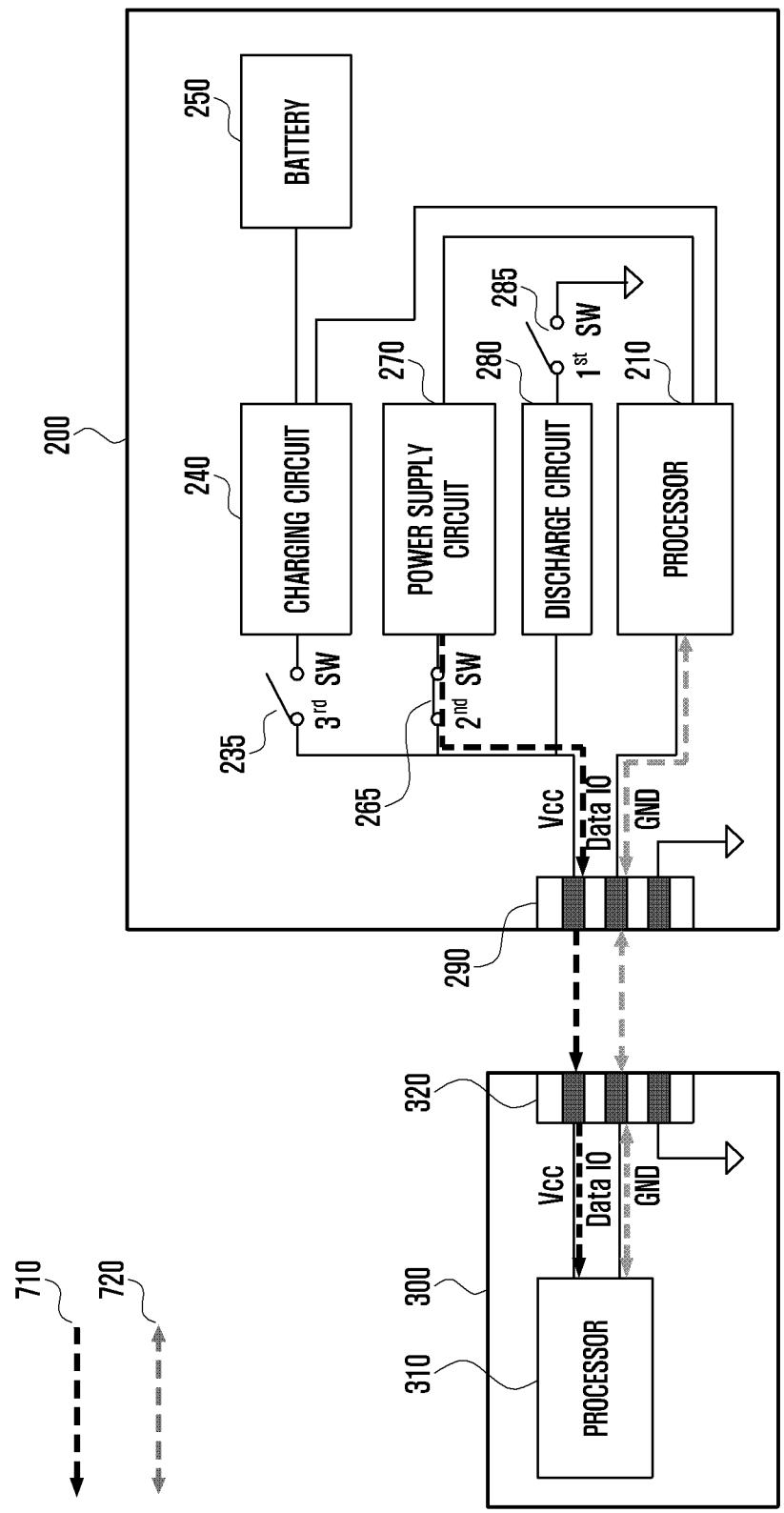
FIGS. 7A, 7B, and 7C are diagrams illustrating a method of controlling discharge of an external electronic device in the case that the external electronic device is connected to an electronic device according to various embodiments of the disclosure.
Figure 7B:
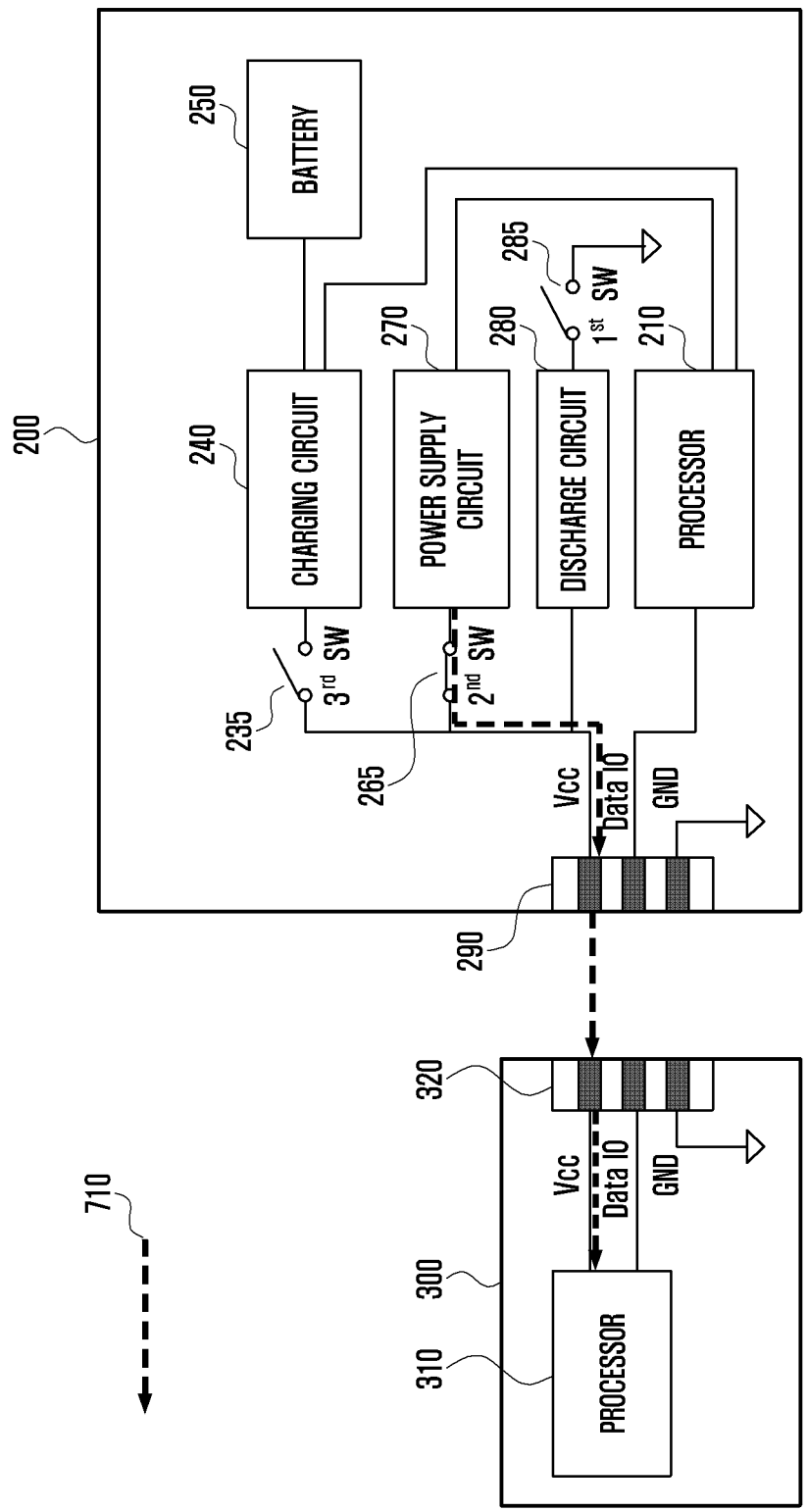
Figure 7C:
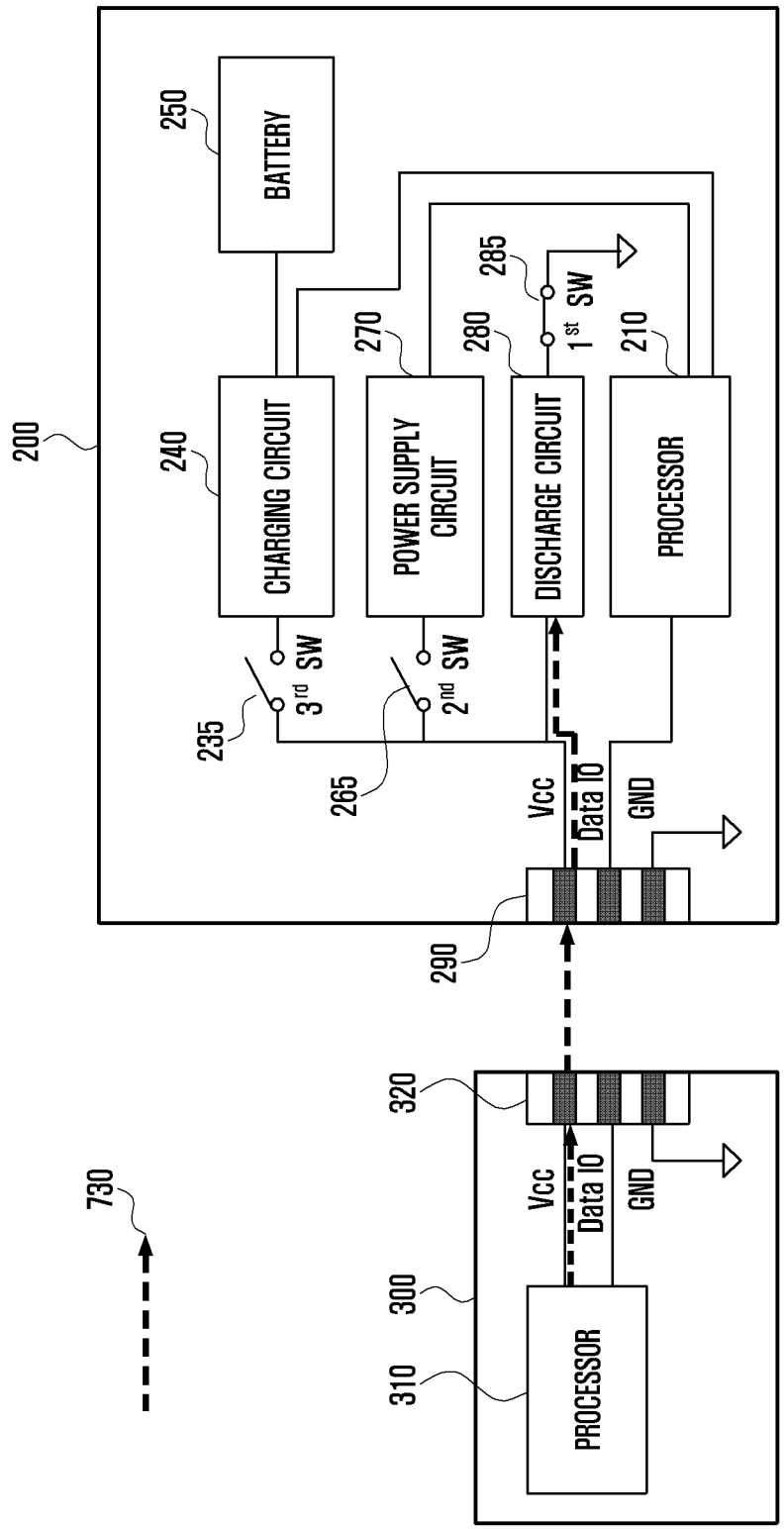

FIGS. 7A, 7B, and 7C are diagrams illustrating a method of controlling discharge of an external electronic device in the case that the external electronic device is connected to an electronic device according to various embodiments of the disclosure.

FIGS. 7A, 7B, and 7C according to various embodiments are diagrams illustrating a method of controlling discharge of the external electronic device 300 according to the above-described embodiment of FIG. 6.

In various embodiments, the electronic device 200 may include at least one of a processor 210, a charging circuit 240, a battery 250, a power supply circuit 270, a discharge circuit 280, or a connector 290. The electronic device 200 may include a first switch 285 for controlling an electrical connection between the discharge circuit 280 and the ground, a second switch 265 for controlling an electrical connection between the connector 290 and the power supply circuit 270, and a third switch 235 for controlling an electrical connection between the connector 290 and the charging circuit 240. The external electronic device 300 may include at least one of a processor 310 or a connector 320.

Referring to FIG. 7A, the processor 210 of the electronic device 200 may identify a connection with the external electronic device 300 based on the contact between the connector 290 of the electronic device 200 and the connector 320 of the external electronic device 300. When a connection with the external electronic device 300 is identified, the processor 210 of the electronic device 200 may receive information (e.g., identification information) 720 related to the external electronic device 300 from the external electronic device 300 through the connector 290 (e.g., the second terminal (e.g., data input/output terminal) of the connector 290).

In yet another embodiment, when the connection with the external electronic device 300 is identified, the processor 210 of the electronic device 200 may control the second switch 265 to be on (e.g., short state) so that the connector 290 and the power supply circuit 270 are electrically connected. The processor 210 of the electronic device 200 may transmit a designated power source (or designated power) 710 supplied through the power supply circuit 270 to the external electronic device 300 through the connector 290 (e.g., the first terminal of the connector 290) based on the electrical connection between the connector 290 and the power supply circuit 270.

In various embodiments, the external electronic device 300 may not include a battery, and may be driven (or operated) using a designated power source (designated power) 710 received from the electronic device 200 through the connector 320 (e.g., the first terminal of the connector 320).

In yet another embodiment, the processor 210 of the electronic device 200 may transmit a signal for requesting a communication connection to the external electronic device 300 through the connector 290 (e.g., the second terminal of the connector 290) while transmitting the designated power source (or designated power) 710 to the external electronic device 300 through the connector 290 (e.g., the first terminal of the connector 290). The processor 210 of the electronic device 200 may identify whether communication with the external electronic device 300 is connected based on whether a response signal is received from the external electronic device 300 in response to the signal for requesting a communication connection.

For example, when a response signal to a signal for requesting a communication connection is received from the external electronic device 300, the processor 210 of the electronic device 200 may identify that communication with the external electronic device 300 is connected, and perform communication with the external electronic device 300. For example, the processor 210 may receive an input signal input from an input device (e.g., the input device 330 of FIG. 3) of the external electronic device 300 through the connector 290 (e.g., the second terminal of the connector 290) from the external electronic device 300.

For another example, when a response signal to a signal for requesting a communication connection is not received from the external electronic device 300, the processor 210 of the electronic device 200 may identify that communication with the external electronic device 300 is not connected. As communication with the external electronic device 300 is not connected, referring to FIG. 7B, operation of transmitting and receiving (720) data through the connector 290 (e.g., the second terminal of the connector 290) may not be performed. In this case, referring to FIG. 7C, the processor 210 of the electronic device 200 may control the second switch 265 to be off (e.g., open state) so that an electrical connection between the connector 290 and the power supply circuit 270 is cut off to stop (or terminate) operation of supplying power from the power supply circuit 270 to the external electronic device 300. After controlling the second switch 265 to be off, the processor 210 of the electronic device 200 may control the first switch 285 to be on (e.g., short state) so that the discharge circuit 280 and the ground are electrically connected. The electronic device 200 may discharge a current 730 received from the external electronic device 300 through the connector 290 (e.g., the first terminal of the connector 290) using the discharge circuit 280 for a designated time. The designated time may be greater than or equal to a discharge time at which a voltage of the external electronic device 300 becomes less than or equal to a designated voltage.

In yet another embodiment, after discharging the current 730 received from the external electronic device 300 for a designated time, the processor 210 of the electronic device 200 may control the first switch 285 to be off (e.g., open state) so as to cut off the electrical connection between the discharge circuit 280 and the ground, and control the second switch 265 to be on (e.g., short state) so that the connector 290 of FIG. 7A and the power supply circuit 270 are electrically connected to transmit power supplied from the power supply circuit 270 to the external electronic device 300 through the connector 290 (e.g., the first terminal of the connector 290).

In various embodiments, although not illustrated, when an external power source (e.g., travel adapter (TA)) is connected to the connector 290, the processor 210 of the electronic device 200 may control the third switch 235 to be on (e.g., short state) so that the connector 290 (e.g., the first terminal of the connector 290) and the charging circuit 240 are electrically connected. The processor 210 of the electronic device 200 may charge the battery 250 through the charging circuit 240 using power received from an external power source.

A method for the electronic device 200 to control discharge of the external electronic device 300 according to various embodiments may include operation of detecting a connection of the external electronic device 300 through the connector 290 in a state in which the discharge circuit 280 of the electronic device 200 is activated; operation of performing first discharge of discharging a current of the connected external electronic device 300 using the discharge circuit 280 for a designated time based on the connection of the external electronic device 300; operation of controlling the first switch 285 to cut off the electrical connection between the discharge circuit 280 and the ground 555 after performing first discharge and controlling the second switch 265 to electrically connect the connector 290 and the power supply circuit 270 to supply designated power to the external electronic device 300; and operation of communicating with the external electronic device 300 based on a successful communication connection with the external electronic device 300.

The method for the electronic device 200 to control discharge of the external electronic device 300 according to various embodiments may further include operation of transmitting a signal for requesting a communication connection to the external electronic device 300 through the connector 290 while supplying the designated power to the external electronic device 300 through the connector 290; operation of determining that communication with the external electronic device 300 is connected when a response signal to a signal for requesting a communication connection is received from the external electronic device 300; and operation of determining that communication with the external electronic device 300 is not connected when a response signal to a signal requesting communication connection is not received from the external electronic device 300.

The method for the electronic device 200 to control discharge of the external electronic device 300 according to various embodiments may further include operation of controlling the second switch 265 to cut off the electrical connection between the connector 290 and the power supply circuits 270 to stop a power source supplied to the external electronic device 300, when it is determined that communication with the external electronic device 300 is not connected, and controlling the first switch 285 to electrically connect the discharge circuit 280 and the ground 555; operation of performing a second discharge by discharging a current of the connected external electronic device 300 using the discharge circuit 280 for the designated time; and operation of controlling the first switch 285 to cut off the electrical connection between the discharge circuit 280 and the ground 555 after performing the second discharge and controlling the second switch 265 to electrically connect the connector 290 and the power supply circuit 270 to supply the designated power to the external electronic device 300.

In various embodiments, the first switch 285 may be disposed between the discharge circuit 280 and the ground 555.

In various embodiments, the designated time may be configured to be greater than or equal to a discharge time at which a voltage of the external electronic device 300 becomes less than or equal to a designated voltage.

In various embodiments, the operation of performing the first discharge may include operation of discharging a current received from the external electronic device 300 through the connector 290 for the designated time so that a voltage of the external electronic device 300 becomes less than or equal to a designated voltage using the discharge circuit 280.

The method for the electronic device 200 to control discharge of the external electronic device 300 according to various embodiments may further include operation of controlling the third switch 235 to electrically connect the connector 290 and the charging circuit 240 when an external power source is connected to the connector 290; and operation of controlling the first switch 285 to cut off the electrical connection between the discharge circuit 280 and the ground 555 based on the electrical connection between the connector 290 and the charging circuit 240 to deactivate the discharge circuit 280 in the activated state.

The method for the electronic device 200 to control discharge of the external electronic device 300 according to various embodiments further may include operation of receiving information related to the external electronic device 300 from the external electronic device 300 through the connector 290 based on the connection of the external electronic device 300.

In various embodiments, the information related to the external electronic device 300 may include identification information of the external electronic device 300.

The method for the electronic device 200 to control discharge of the external electronic device 300 according to various embodiments may further include operation of controlling the second switch 265 to electrically connect the connector 290 and the power supply circuit 270 when a connection with the external electronic device 300 is detected through the connector 290 in a state in which the discharge circuit 280 is deactivated to supply the designated power to the external electronic device 300; operation of controlling the second switch 265 to cut off the electrical connection between the connector 290 and the power supply circuit 270 and controlling the first switch 285 to electrically connect the discharge circuit 280 and the ground 555 based on the failure of the communication connection with the external electronic device 300; operation of discharging a current of the external electronic device 300 received through the connector 290 using the discharge circuit 280 for the designated time; and operation of controlling the first switch 285 to cut off the electrical connection between the discharge circuit 280 and the ground 555 and controlling the second switch 265 to electrically connect the connector 290 and the power supply circuit 270 to supply the designated power to the external electronic device 300.

In various embodiments, the operation of discharging a current of the external electronic device 300 for a designated time may include operation of discharging a current received from the external electronic device 300 through the connector 290 for a designated time so that a voltage of the external electronic device 300 becomes less than or equal to a designated voltage using the discharge circuit 280.

Referring to FIGS. 3, 4, 5A to 5E, 6, and 7A to 7C according to various embodiments, it has been described that the connector 290 and the charging circuit 240 or the power supply circuit 270 are electrically connected (or cut off an electrical connection) by controlling the second switch 265 or the third switch 235, but the disclosure is not limited thereto. For example, the electronic device 200 may control an electrical connection between the connector 290 and the charging circuit 240 or the power supply circuit 270 through one switching circuit (e.g., field effect transistor (FET) switching circuit). In this regard, various embodiments will be described with reference to FIGS. 8A to 8D and 9A to 9C to be described later.

FIGS. 8A, 8B, 8C, and 8D are diagrams illustrating a method of controlling discharge of an external electronic device in the case that the external electronic device is connected to an electronic device according to various embodiments of the disclosure.

Referring to FIGS. 8A, 8B, 8C, and 8D according to various embodiments, the discharge circuit (e.g., the discharge circuit 280 of FIG. 3) of the electronic device (e.g., the electronic device 200 of FIG. 2) may be in an activated state by default. FIGS. 8A, 8B, 8C, and 8D are diagrams illustrating a method of controlling discharging of the external electronic device 300 in an activated state in which the discharge circuit 280 is configured by default.

Referring to FIGS. 8A, 8B, 8C, and 8D, the electronic device 200 may include at least one of a processor 210, a charging circuit 240, a power supply circuit 270, a discharge circuit 280, a connector 290, an OVP circuit 805, or a switching circuit 810. For example, the OVP circuit 805 may be an overvoltage protection circuit for protecting at least one of the charging circuit 240 or the power supply circuit 270. The switching circuit 810 may control an electrical connection between the connector 290 and the charging circuit 240 or the power supply circuit 270. The electronic device 200 may include a switch 815 (e.g., the first switch 285 of FIG. 3) that controls an electrical connection between the discharge circuit 280 and the ground. The external electronic device 300 may include a processor 310 and/or a connector 320.

Referring to FIG. 8A, the processor 210 of the electronic device 200 may identify a connection with the external electronic device 300 based on the contact between the connector 320 of the external electronic device 300 and the connector 290 of the electronic device 200. When the connection with the external electronic device 300 is identified, the processor 210 of the electronic device 200 may transmit and receive (825) data (e.g., information (e.g., identification information) related to the external electronic device 300 and/or data for communication connection with the external electronic device 300) to and from the processor 310 of the external electronic device 300) through the connector 290 (e.g., the second terminal (e.g., data input/output terminal) of the connector 290).

In various embodiments, the switch 815 may be configured to an on state (e.g., short state) so that the discharge circuit 280 and the ground are electrically connected. Accordingly, when a connection of the external electronic device 300 is identified, the processor 210 of the electronic device 200 may perform a first discharge by discharging a current 820 of the external electronic device 300 received through the connector 290 (e.g., the first terminal (e.g., Vcc terminal) of the connector 290) using the discharge circuit 280 for a designated time. The designated time may be greater than or equal to a discharge time at which a voltage of the external electronic device 300 becomes less than or equal to a designated voltage.

Figure 8B:
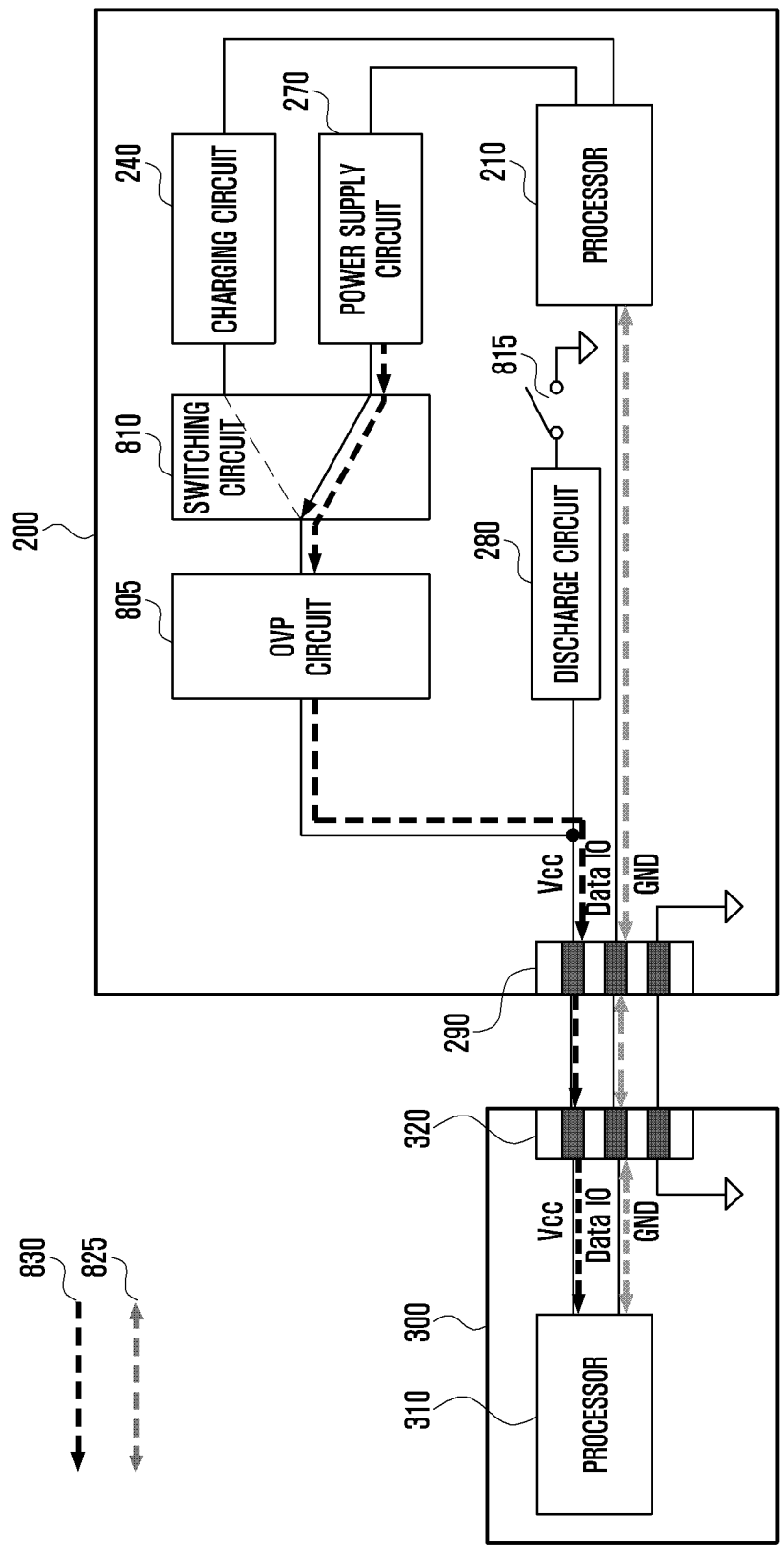

Referring to FIG. 8B, after performing the first discharge, the processor 210 of the electronic device 200 may control the switch 815 to be off (e.g., open state) so as to cut off the electrical connection between the discharge circuit 280 and the ground. As the switch 815 is controlled to be off (e.g., open state), the processor 210 of the electronic device 200 may stop (or terminate) an operation of discharging a current of the external electronic device 300. After controlling the switch 815 to be off (e.g., open state), the processor 210 of the electronic device 200 may control the switching circuit 810 to electrically connect the connector 290 (e.g., the first terminal of the connector 290) and the power supply circuit 270. The processor 210 of the electronic device 200 may transmit a designated power source (or designated power) 830 supplied through the power supply circuit 270 to the external electronic device 300 through the connector 290 (e.g., the first terminal of the connector 290) based on the electrical connection between the connector 290 (e.g., the first terminal of the connector 290) and the power supply circuit 270. The external electronic device 300 may not include a battery, and may be driven (or operated) using a designated power source (or designated power) 830 received from the electronic device 200 through the connector 320 (e.g., the first terminal of the connector 320).

In an embodiment, the processor 210 of the electronic device 200 may transmit a signal for requesting a communication connection to the external electronic device 300 through the connector 290 (e.g., the second terminal of the connector 290) while transmitting the designated power source (or designated power) 830 to the external electronic device 300 through the connector 290 (e.g., the first terminal of the connector 290). When a response signal to a signal for requesting a communication connection is received from the external electronic device 300 through the connector 290 (e.g., the second terminal of the connector 290), the processor 210 of the electronic device 200 may identify that communication with the external electronic device 300 is connected and perform communication with the external electronic device 300. For example, the processor 210 may receive an input signal input from an input device (e.g., the input device 330 of FIG. 3) of the external electronic device 300 through the connector 290 (e.g., the second terminal of the connector 290) from the external electronic device 300.

Figure 8C:
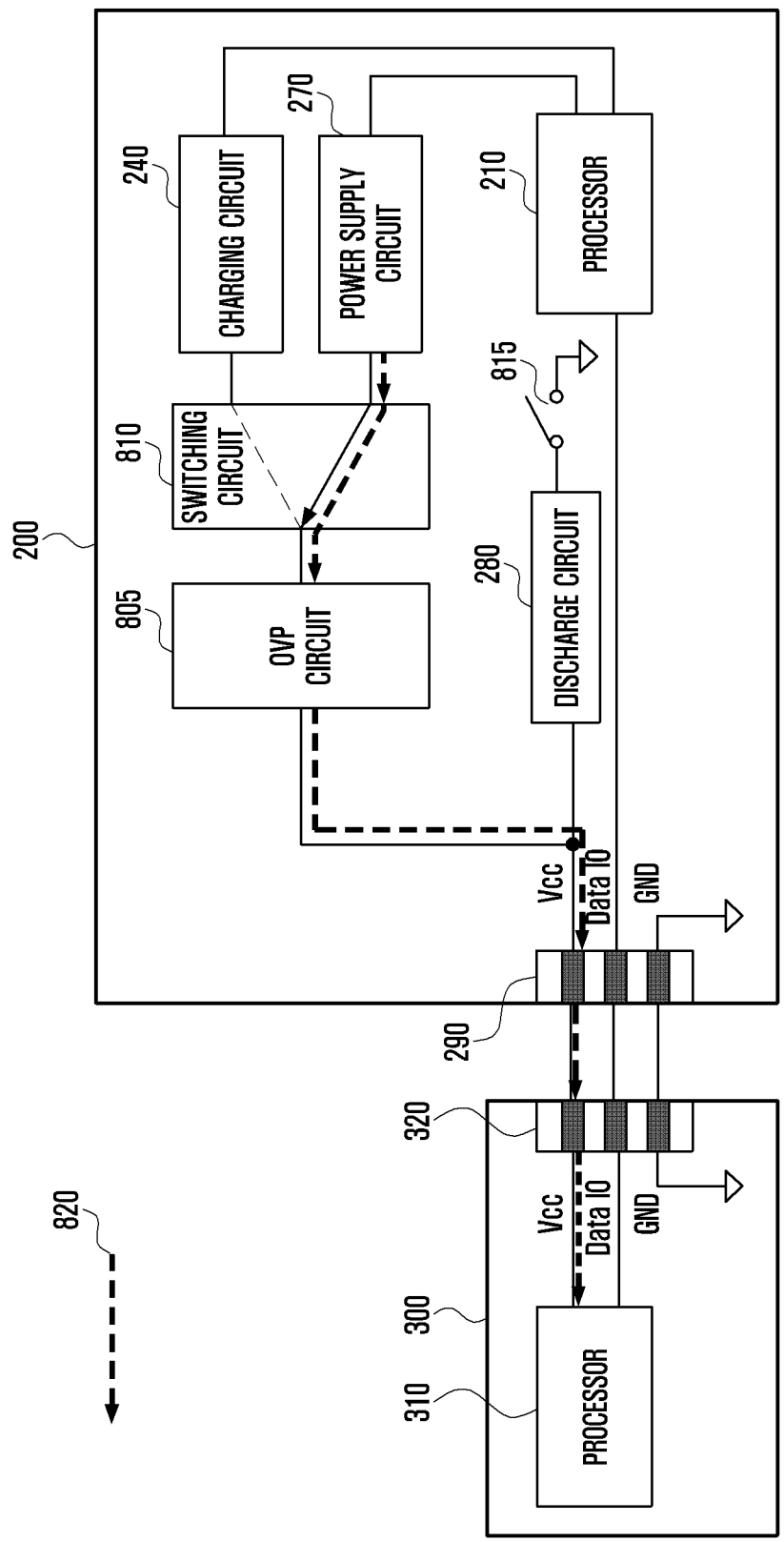
Figure 8D:
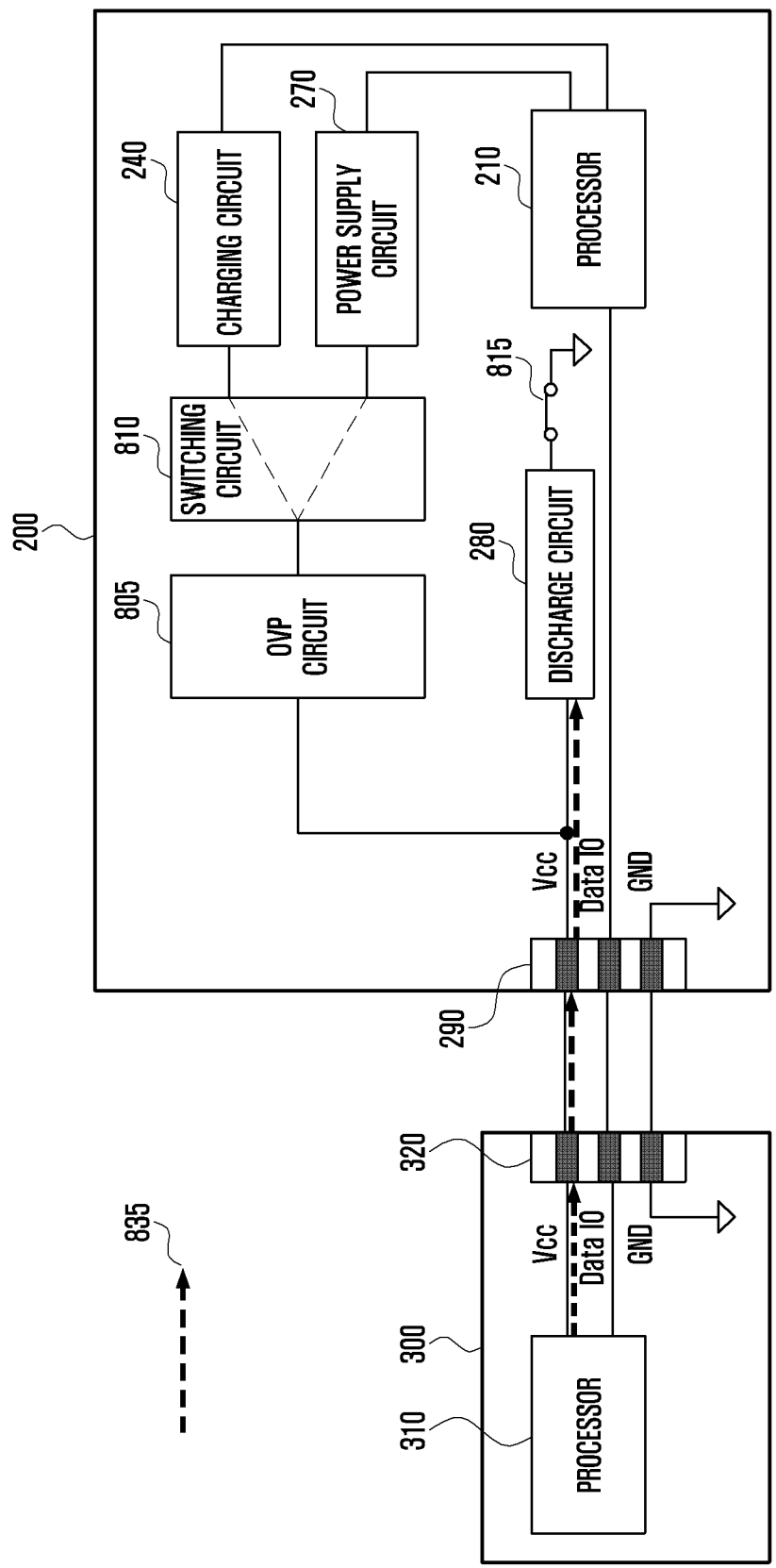

In another embodiment, when a response signal to a signal for requesting a communication connection is not received from the external electronic device 300, the processor 210 of the electronic device 200 may identify that communication with the external electronic device 300 is not connected. Referring to FIG. 8C, as communication with the external electronic device 300 is not connected, an operation of transmitting and receiving (825) data through the connector 290 (e.g., the second terminal of the connector 290) may not be performed. Referring to FIG. 8D, the processor 210 of the electronic device 200 may control the switching circuit 810 to cut off the electrical connection between the connector 290 (e.g., the first terminal of the connector 290) and the power supply circuit 270. As the electrical connection between the connector 290 (e.g., the first terminal of the connector 290) and the power supply circuit 270 is cut off, an operation of supplying power from the power supply circuit 270 to the external electronic device 300 through the connector 290 (e.g., the first terminal of the connector 290) may be stopped. After cutting off the electrical connection between the connector 290 and the power supply circuit 270, the processor 210 of the electronic device 200 may control the switch 815 to be on (e.g., short state) so that the discharge circuit 280 and the ground are electrically connected. The electronic device 200 may perform a second discharge by discharging a current 835 received from the external electronic device 300 through the connector 290 (e.g., the first terminal of the connector 290) using the discharge circuit 280 for a designated time. After performing the second discharge, the processor 210 of the electronic device 200 may control the switch 815 to be off (e.g., open state) so that an electrical connection between the discharge circuit 280 and the ground is cut off, and control the switching circuit 810 to electrically connect the connector 290 (e.g., the first terminal of the connector 290) of FIG. 8B and the power supply circuit 270 to transmit power supplied from the power supply circuit 270 to the external electronic device 300 through the connector 290 (e.g., the first terminal of the connector 290).

In various embodiments, although not illustrated, when an external power source (e.g., travel adapter (TA)) is connected to the connector 290, the processor 210 of the electronic device 200 may control the switching circuit 810 to electrically connect the connector 290 (e.g., the first terminal of the connector 290) and the charging circuit 240. The processor 210 of the electronic device 200 may charge the battery 250 through the charging circuit 240 using designated power received from an external power source. In this case, the processor 210 of the electronic device 200 may control the switch 815 to be off (e.g., open state) so that the electrical connection between the discharge circuit 280 and the ground is cut off.

Figure 9A:
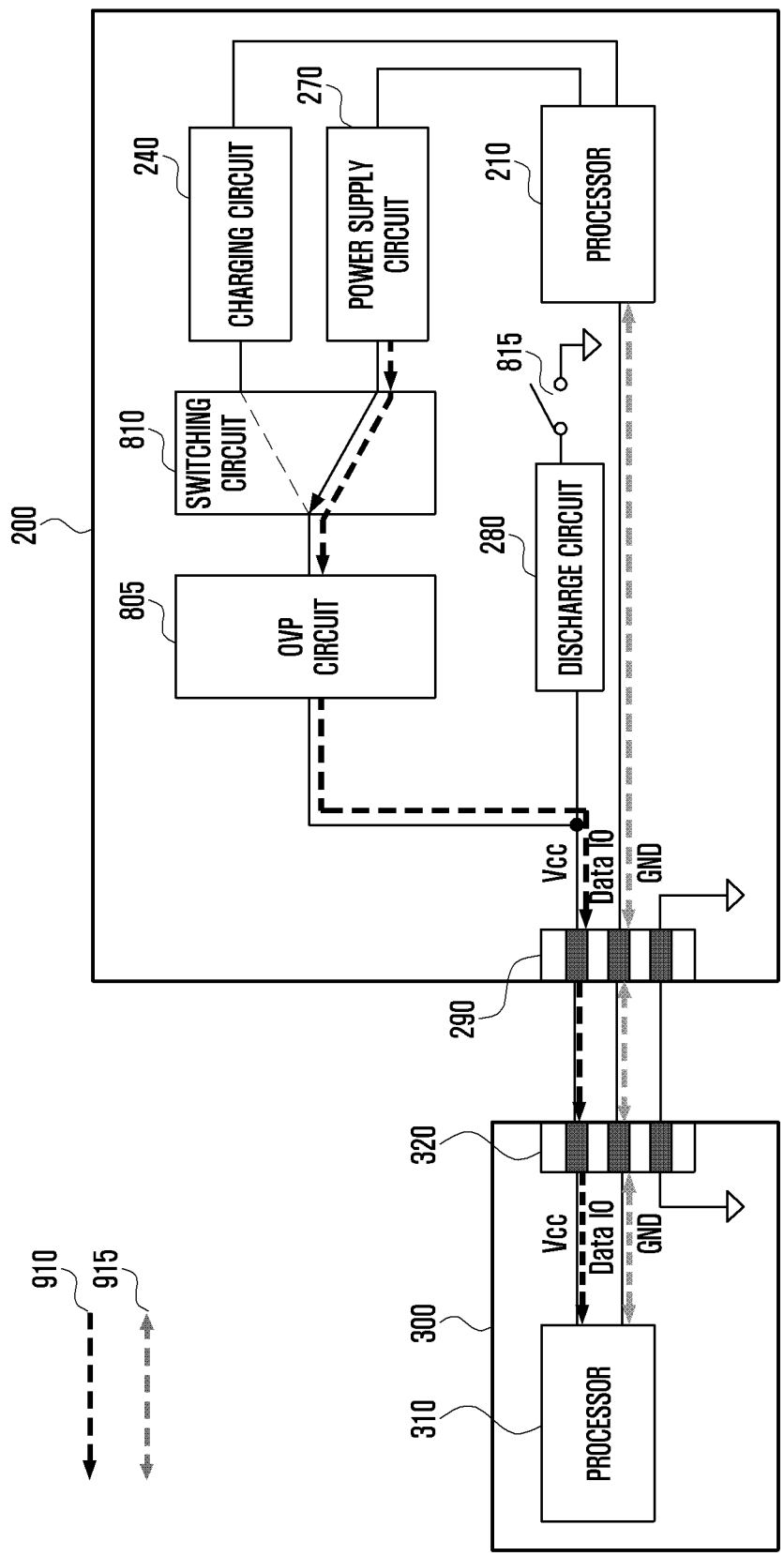
FIGS. 9A, 9B, and 9C are diagrams illustrating a method of controlling discharge of an external electronic device in the case that the external electronic device is connected to an electronic device according to various embodiments of the disclosure.
Figure 9B:
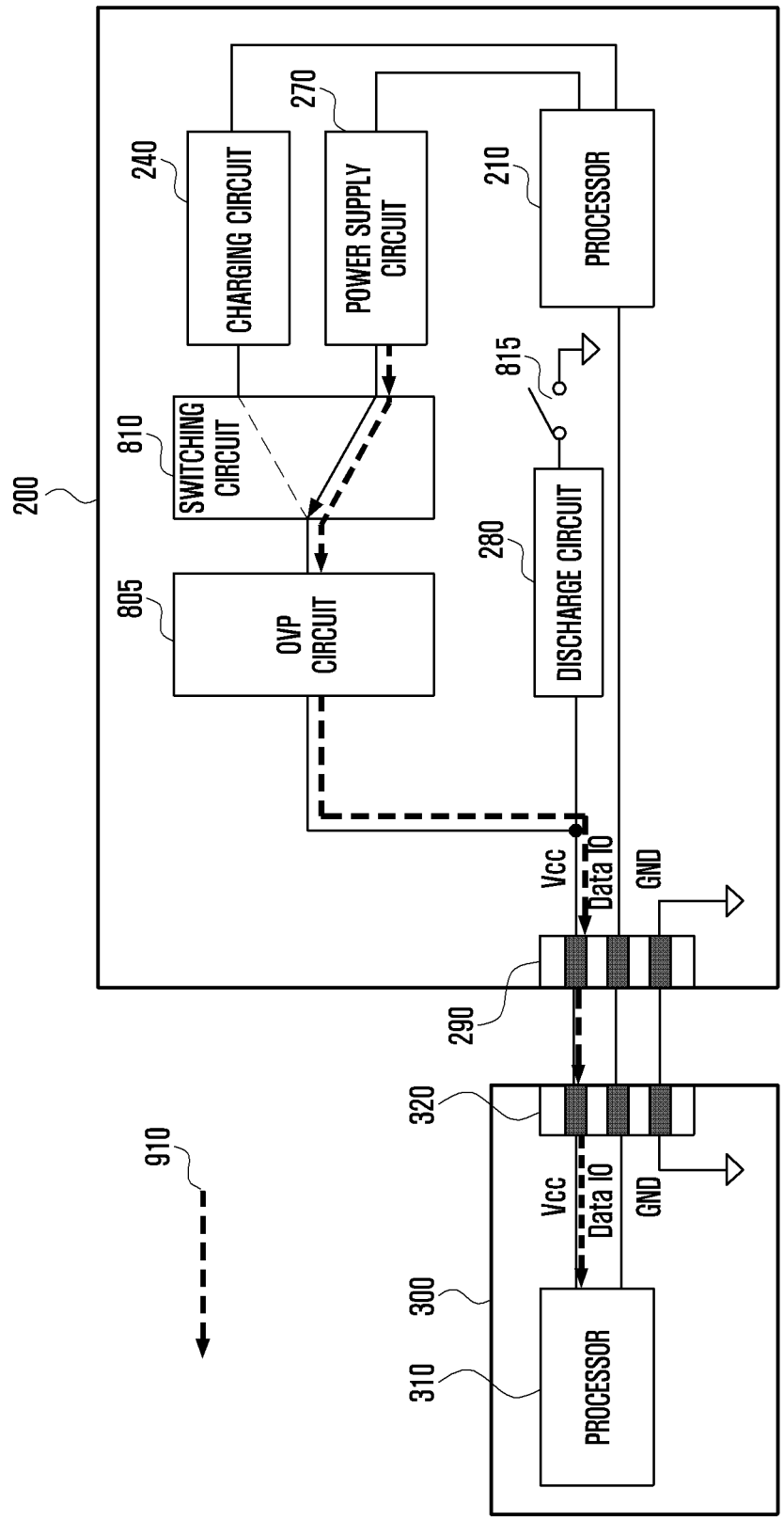
Figure 9C:
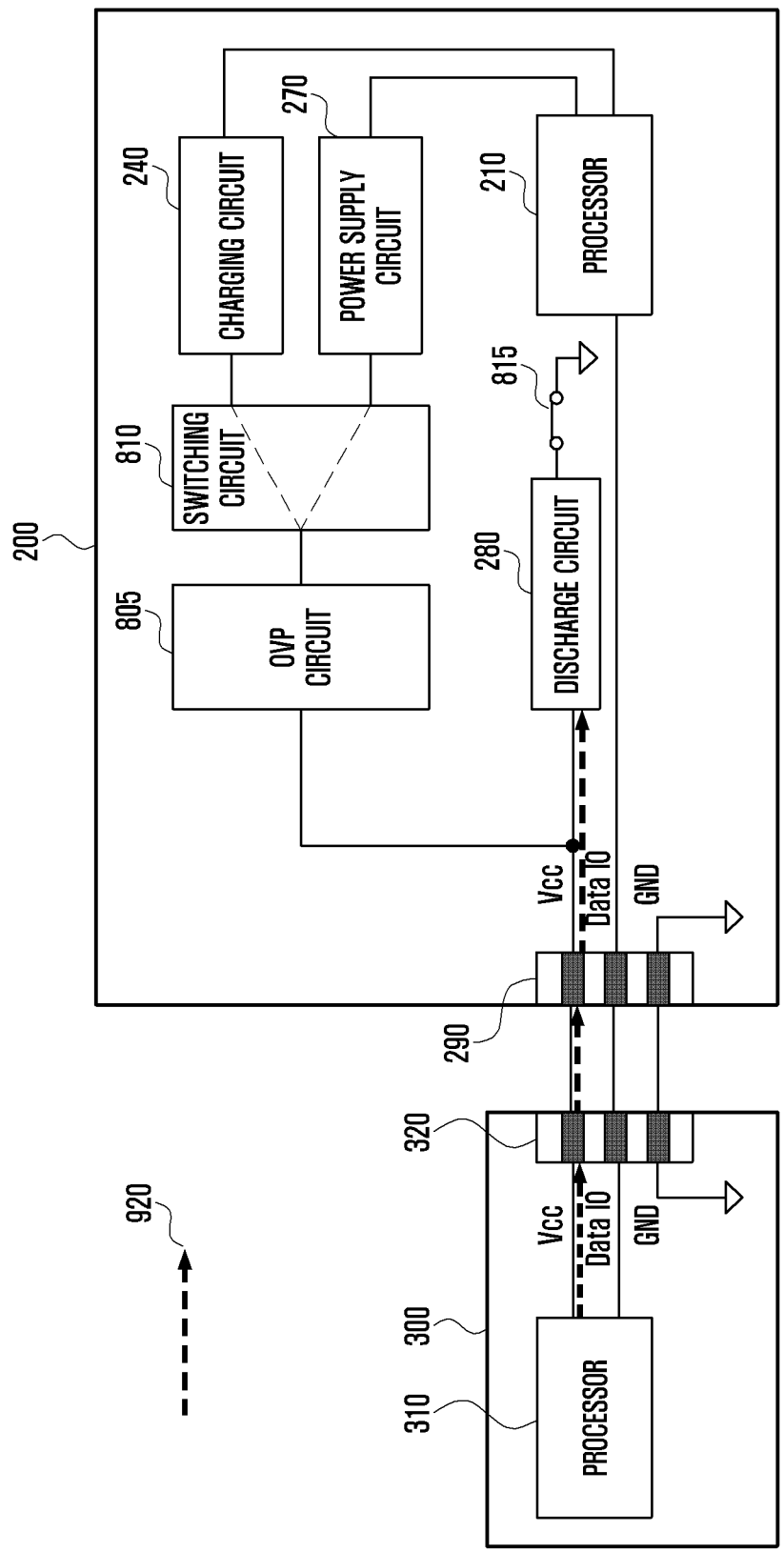

FIGS. 9A, 9B, and 9C are diagrams illustrating a method of controlling discharge of an external electronic device in the case that the external electronic device is connected to an electronic device according to various embodiments of the disclosure.

Referring to FIGS. 9A, 9B, and 9C according to various embodiments, the discharge circuit (e.g., the discharge circuit 280 of FIG. 3) of the electronic device (e.g., the electronic device 200 of FIG. 2) may be in a deactivated state by default. FIGS. 9A, 9B, and 9C are diagrams illustrating a method of controlling discharging of the external electronic device 300 in a state in which the discharge circuit 280 is configured to a deactivated state by default.

Referring to FIG. 9A, the processor 210 of the electronic device 200 may identify a connection with the external electronic device 300 based on the contact between the connector 290 and the connector 320 of the external electronic device 300. When the connection with the external electronic device 300 is identified, the processor 210 of the electronic device 200 may receive information (e.g., identification information) 915 related to the external electronic device 300 from the external electronic device 300 through the connector 290 (e.g., the second terminal (e.g., data input/output terminal) of the connector 290).

In an embodiment, when the connection with the external electronic device 300 is identified, the processor 210 of the electronic device 200 may control the switching circuit 810 to electrically connect the connector 290 (e.g., the first terminal (e.g., Vcc terminal) of the connector 290) and the power supply circuit 270. The processor 210 of the electronic device 200 may transmit a designated power source 910 (or designated power) supplied from the power supply circuit 270 to the external electronic device 300 through the connector 290 (e.g., the first terminal of the connector 290) based on the electrical connection between the connector 290 (e.g., the first terminal of the connector 290) and the power supply circuit 270. The external electronic device 300 may not include a battery and may be driven (or operated) using a designated power source (or designated power) 910 received from the electronic device 200 through the connector 320 (e.g., the first terminal of the connector 320).

In another embodiment, the processor 210 of the electronic device 200 may transmit a signal for requesting a communication connection to the external electronic device 300 through the connector 290 (e.g., the second terminal of the connector 290) while transmitting the designated power source (or designated power) 910 to the external electronic device 300 through the connector 290 (e.g., the first terminal of the connector 290). When a response signal to a signal for requesting a communication connection is received from the external electronic device 300 through the connector 290 (e.g., the second terminal of the connector 290), the processor 210 of the electronic device 200 may identify that communication with the external electronic device 300 is connected, and perform communication with the external electronic device 300. For example, the processor 210 may receive an input signal input from an input device (e.g., the input device 330 of FIG. 3) of the external electronic device 300 through the connector 290 (e.g., the second terminal of the connector 290) from the external electronic device 300.

In yet another embodiment, when a response signal to a signal for requesting a communication connection is not received from the external electronic device 300, the processor 210 of the electronic device 200 may identify that communication with the external electronic device 300 is not connected. As communication with the external electronic device 300 is not connected, referring to FIG. 9B, an operation of transmitting and receiving (915) data through the connector 290 (e.g., the second terminal of the connector 290) may not be performed. Referring to FIG. 9C, the processor 210 of the electronic device 200 may control the switching circuit 810 to cut off the electrical connection between the connector 290 and the power supply circuit 270 to stop (or terminate) an operation of supplying power from the power supply circuit 270 to the external electronic device 300. The processor 210 of the electronic device 200 may control the switch 815 to be on (e.g., short state) so that the discharge circuit 280 and the ground are electrically connected. The electronic device 200 may discharge a current 920 received from the external electronic device 300 through the connector 290 (e.g., the first terminal of the connector 290) using the discharge circuit 280 for a designated time. The designated time may be greater than or equal to a discharge time at which a voltage of the external electronic device 300 becomes less than or equal to a designated voltage. After discharging the current 920 received from the external electronic device 300, for a designated time, the processor 210 of the electronic device 200 may control the switch 815 to be off (e.g., open state) so as to cut off the electrical connection between the discharge circuit 280 and the ground and control the switching circuit 810 to electrically connect the connector 290 (e.g., the first terminal of the connector 290) of FIG. 9A and the power supply circuit 270 to transmit power supplied from the power supply circuit 270 to the external electronic device 300 through the connector 290 (e.g., the first terminal of the connector 290).

In various embodiments, although not illustrated, when an external power source (e.g., travel adapter (TA)) is connected to the connector 290, the processor 210 of the electronic device 200 may control the switching circuit 810 to electrically connect the connector 290 (e.g., the first terminal of the connector 290) and the charging circuit 240. The processor 210 of the electronic device 200 may charge the battery 250 through the charging circuit 240 using power received from an external power source.

Referring to FIGS. 8A to 8D and 9A to 9C according to various embodiments, it has been described that the discharge circuit 280 and the ground are electrically connected (or cut off an electrical connection) by controlling the switch 815, but the disclosure is not limited thereto. For example, the discharge circuit 280 may be connected to the switching circuit 810. In this case, the processor 210 of the electronic device 200 may control the switching circuit 810 to electrically connect (or cut off an electrical connection) the connector 290 (e.g., the first terminal of the connector 290) and the discharge circuit 280.

Figure 10:
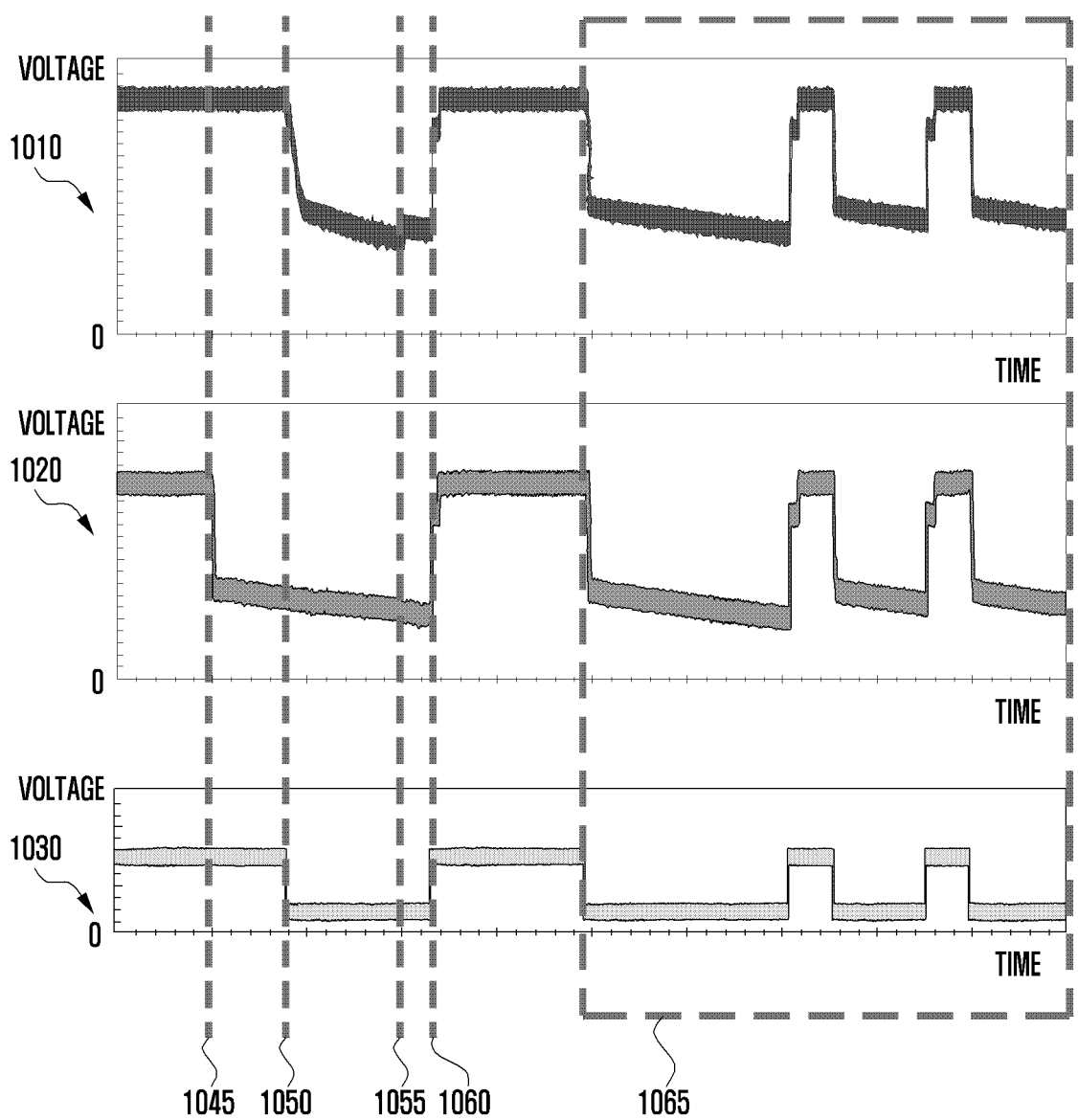
FIG. 10 is a graph illustrating a method of controlling discharge of an external electronic device in the case that the external electronic device is connected to an electronic device according to an embodiment of the disclosure.

FIG. 10 is a graph illustrating a method of controlling discharge of an external electronic device in the case that the external electronic device is connected to an electronic device according to a comparative example according to an embodiment of the disclosure.

Referring to FIG. 10, a graph 1010 illustrates a voltage of an electronic device. A graph 1020 illustrates a voltage of an external electronic device (e.g., the external electronic device 300 of FIG. 2). A graph 1030 illustrates a voltage of a power supply circuit of the electronic device. In each graph, the x-axis may represent a time, and the y-axis may represent a voltage.

At a first time 1045, the external electronic device 300 may be disconnected (e.g., detached) from the connector of the electronic device. As illustrated in the graph 1020, a discharging operation of the external electronic device 300 may be performed at the first time 1045 based on the disconnection (e.g., detachment) of the external electronic device 300 from the electronic device. For example, with reference to the graph 1010, the electronic device may recognize disconnection (e.g., detachment) of the external electronic device 300 at a second time 1050. As illustrated in the graph 1030, the electronic device may control the power supply circuit to a deactivated state at the second time 1050 based on recognizing disconnection (e.g., detachment) of the external electronic device 300. For example, the electronic device may cut off the electrical connection between the connector and the power supply circuit to control the power supply circuit to be in a deactivated state. At a third time 1055, the electronic device may detect a connection (e.g., mounting) of the external electronic device 300 based on the contact between the connector 290 of the electronic device and the connector of the external electronic device 300 (e.g., the connector 320 of FIG. 3).

With reference to graphs 1010 and 1030, the electronic device may recognize a connection (e.g., mounting) of the external electronic device 300 at a fourth time 1060, and control the power supply circuit to an activated state (e.g., control to electrically connect the connector and the power supply circuit) and perform communication with the external electronic device 300. In this case, as illustrated in the graph 1020, in a state in which a voltage of the external electronic device 300 exceeds a designated voltage (e.g., reset voltage (e.g., about 1 v)), as the external electronic device 300 is reconnected (e.g., remounted) to the electronic device, a malfunction of the external electronic device 300 may occur. Due to a malfunction of the external electronic device 300, the electronic device may fail in a communication connection with the external electronic device 300. Due to a communication connection failure with the external electronic device 300, the electronic device may control the power supply circuit to a deactivated state (e.g., cut off the electrical connection between the connector and the power supply circuit), as illustrated in the graph 1030, and the external electronic device 300 may perform a reset. In this case, because a time for resetting the external electronic device 300 (e.g., a time interval between the second time 1050 and the fourth time 1060) is shorter than a time required for discharging a current of the external electronic device 300, as illustrated in graph 1065, a state in which the external electronic device 300 is connected to the electronic device and a state in which the external electronic device 300 is not connected to the electronic device may occur repeatedly, and accordingly, an activated state and a deactivated state of the power supply circuit may occur repeatedly.

Figure 11A:
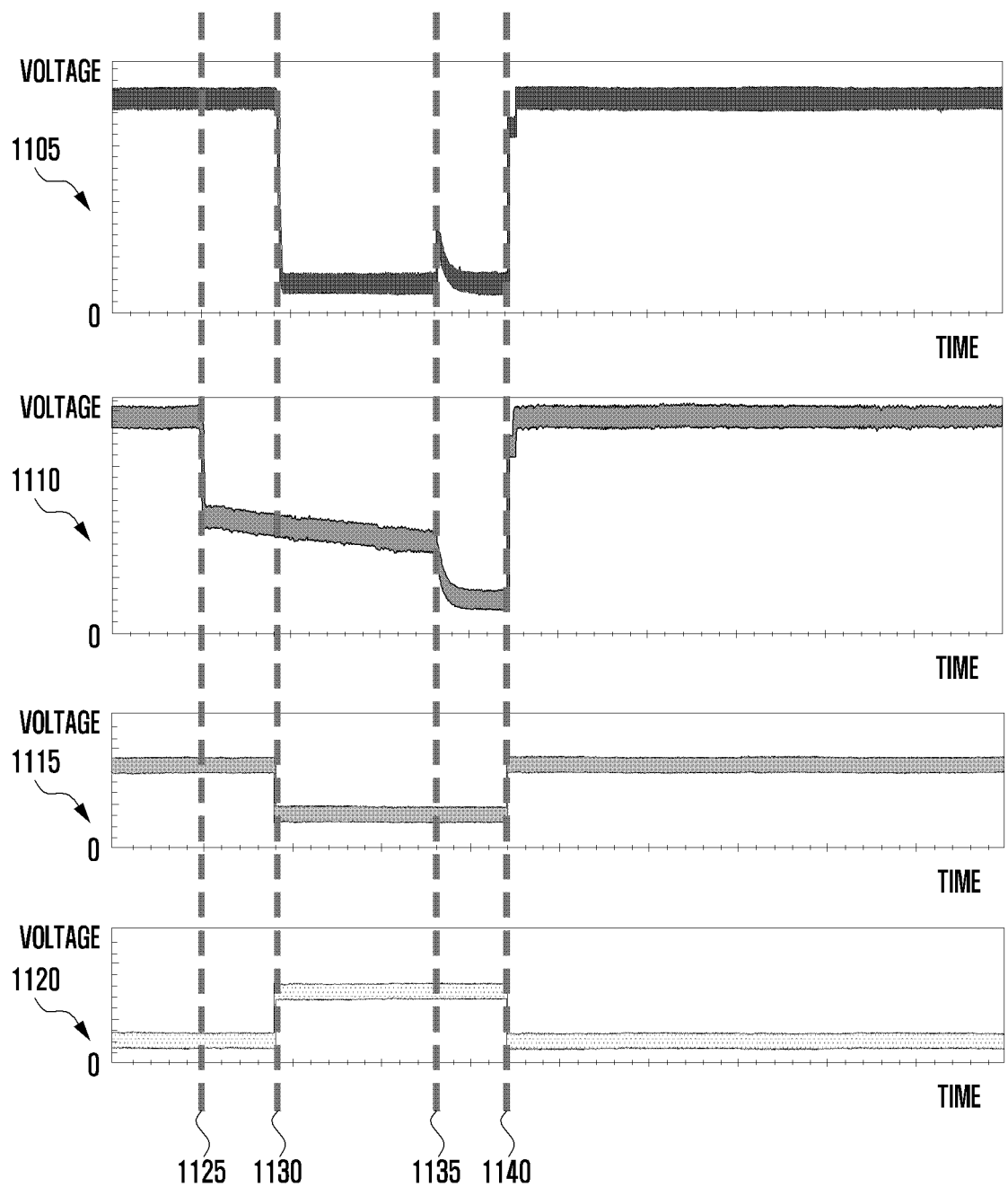
FIGS. 11A and 11B are graphs illustrating a method of controlling discharge of an external electronic device in the case that the external electronic device is connected to an electronic device according to various embodiments of the disclosure.
Figure 11B:
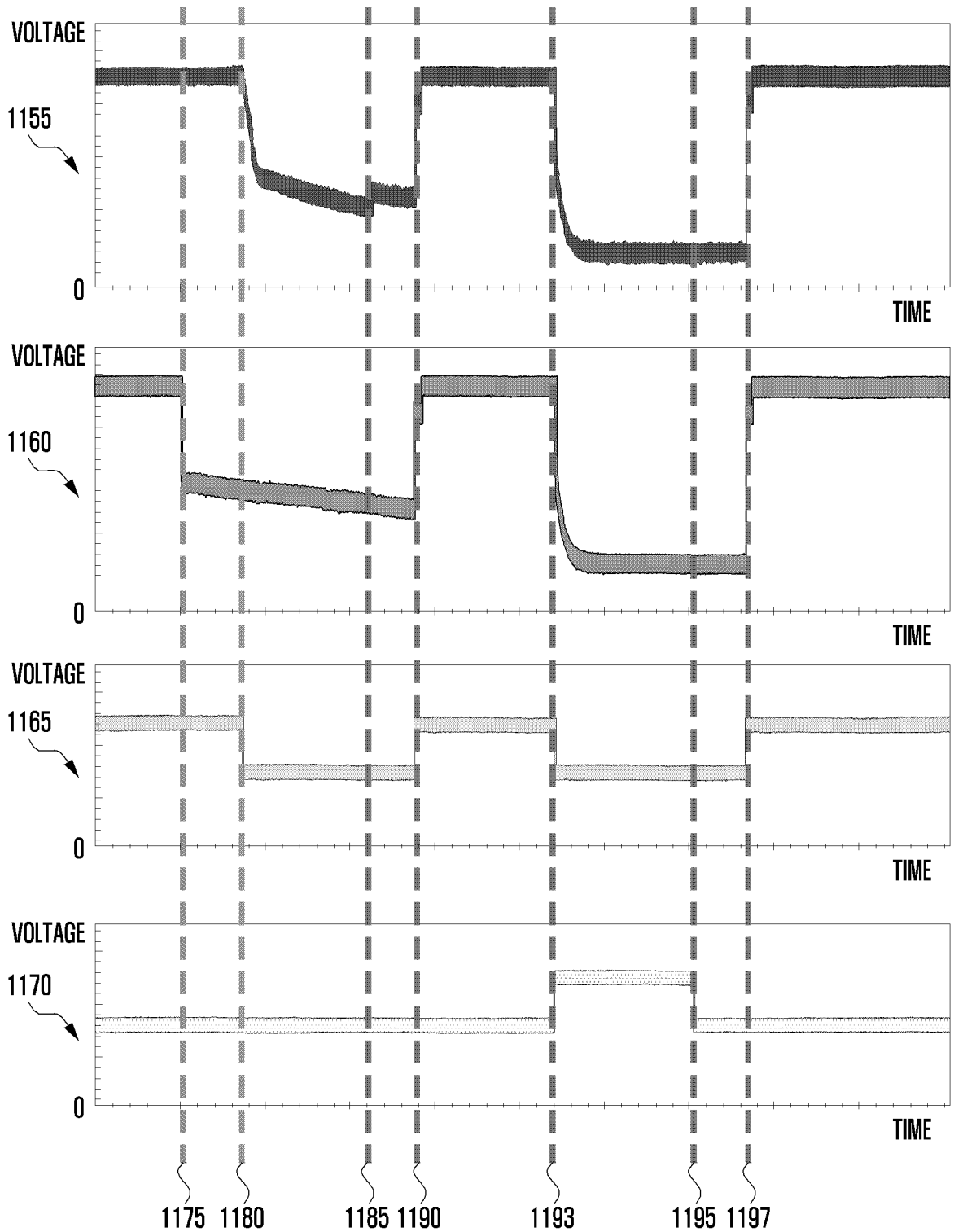

FIGS. 11A and 11B are graphs illustrating a method of controlling discharge of an external electronic device in the case that the external electronic device is connected to an electronic device according to various embodiments of the disclosure.

FIG. 11A according to various embodiments may be a graph according to the above-described embodiments of FIGS. 4 and 5A to 5D.

Referring to FIG. 11A, a graph 1105 illustrates a voltage of an electronic device (e.g., the electronic device 200 of FIG. 2). A graph 1110 illustrates a voltage of an external electronic device (e.g., the external electronic device 300 of FIG. 2). A graph 1115 illustrates a voltage of a power supply circuit (e.g., the power supply circuit 270 of FIG. 3) of the electronic device 200. A graph 1120 illustrates a voltage of a discharge circuit (e.g., the discharge circuit 280 of FIG. 3) of the electronic device 200. In each graph, the x-axis may represent a time, and the y-axis may represent a voltage.

In an embodiment, with reference to the graph 1110, the external electronic device 300 may be disconnected (e.g., detached) from the connector 290 of the electronic device 200 at a first time 1125. With reference to the graph 1105, the electronic device 200 may recognize disconnection (e.g., detachment) of the external electronic device 300 from the electronic device 200 at a second time 1130. Based on recognizing disconnection (e.g., detachment) of the external electronic device 300, the electronic device 200 may control the discharge circuit 280 to an activated state (e.g., electrically connect the connector 290 and the discharge circuit 280) at the second time 1130 (e.g., see graph 1120), and control the power supply circuit 270 in a deactivated state (e.g., cut off the electrical connection between the connector 290 and the power supply circuit 270) (e.g., see the graph 1115). The electronic device 200 may discharge a current received from the external electronic device 300 using the discharge circuit 280 in an activated state for a designated time.

In another embodiment, with reference to the graph 1110, the external electronic device 300 may be connected (e.g., mounted) based on the contact between the connector (e.g., the connector 320 of FIG. 3) of the external electronic device 300 and the connector 290 of the electronic device 200 at a third time 1135. With reference to the graph 1105, the electronic device 200 may discharge a current received from the external electronic device 300 using the discharge circuit 280 for a designated time based on recognizing the connection (e.g., mounting) of the external electronic device 300. For example, the electronic device 200 may discharge a current received from the external electronic device 300 for a designated time so that a voltage of the external electronic device 300 becomes less than or equal to a designated voltage (e.g., about 1 v) using the discharge circuit 280.

In yet another embodiment, after discharging a current received from the external electronic device 300 for a designated time, the electronic device 200 may control the discharge circuit 280 to a deactivated state at a fourth time 1140 (e.g., cut off the electrical connection between the connector 290 and the discharge circuit 280)(e.g., see graph 1120), and control the power supply circuit 270 to an activated state (e.g., electrically connect the connector 290 and the power supply circuit 270) (e.g., see graph 1115) to supply power to the external electronic device 300. After discharging a current received from the external electronic device 300 for a designated time so that a voltage of the external electronic device 300 becomes less than or equal to a designated voltage (e.g., about 1 v), the electronic device 200 performs a reset operation that controls the power supply circuit 270 in a deactivated state to an activated state; thus, a malfunction of the external electronic device 300 may not occur according to a communication connection with the external electronic device 300.

FIG. 11B according to various embodiments may be a graph according to the above-described embodiments of FIGS. 6 and 7A to 7C.

Referring to FIG. 11B, a graph 1155 illustrates a voltage of the electronic device 200. A graph 1160 illustrates a voltage of the external electronic device 300. A graph 1165 illustrates a voltage of the power supply circuit 270 of the electronic device 200. A graph 1170 illustrates a voltage of the discharge circuit 280 of the electronic device 200. In each graph, the x-axis may represent a time, and the y-axis may represent a voltage.

In an embodiment, with reference to the graph 1160, the external electronic device 300 may be disconnected (e.g., detached) from the connector 290 of the electronic device 200 at a first time 1175. With reference to the graph 1155, the electronic device 200 may recognize detachment of the external electronic device 300 at a second time 1180. The electronic device 200 may control the power supply circuit 270 to a deactivated state at the second time 1180 (e.g., see the graph 1165) based on recognizing detachment of the external electronic device 300.

In yet another embodiment, with reference to the graph 1160, the external electronic device 300 may be reconnected (e.g., remounted) based on the contact between the connector (e.g., the connector 320 of FIG. 3) of the external electronic device 300 and the connector 290 of the electronic device 200 at a third time 1185. The electronic device 200 may recognize that the external electronic device 300 is reconnected at a fourth time 1190, and control the power supply circuit 270 to an activated state (e.g., see the graph 1165). The electronic device 200 may transmit a signal for a communication connection with the external electronic device 300. In this case, a malfunction of the external electronic device 300 may occur as the external electronic device 300 is reconnected (e.g., remounted) in a state in which a voltage of the external electronic device 300 exceeds a designated voltage (e.g., about 1 v). Due to a malfunction of the external electronic device 300, the electronic device 200 may fail in a communication connection with the external electronic device 300. Due to a communication connection failure with the external electronic device 300, the electronic device 200 may control the power supply circuit 270 to a deactivated state (e.g., cut off the electrical connection between the connector 290 and the power supply circuit 270) at a fifth time 1193, as illustrated in the graph 1065, and control the discharge circuit 280 to an activated state (e.g., see graph 1170). The electronic device 200 may discharge a current received from the external electronic device 300 for a designated time so that a voltage of the external electronic device 300 becomes less than or equal to a designated voltage (e.g., about 1 v) using the discharge circuit 280.

In yet another embodiment, after discharging a current received from the external electronic device 300 for a designated time, the electronic device 200 may control the discharge circuit 280 to a deactivated state at a sixth time 1195 (e.g., see graph 1170) and control the power supply circuit 270 to an activated state (e.g., see graph 1165) at a seventh time 1197 to supply power to the external electronic device 300. After discharging a current received from the external electronic device 300 for a designated time so that a voltage of the external electronic device 300 becomes less than or equal to a designated voltage (e.g., about 1 v), by performing a reset operation that controls the power supply circuit 270 in a deactivated state to an activated state, the electronic device 200 may smoothly perform a communication connection with the external electronic device 300.

Figure 12A:
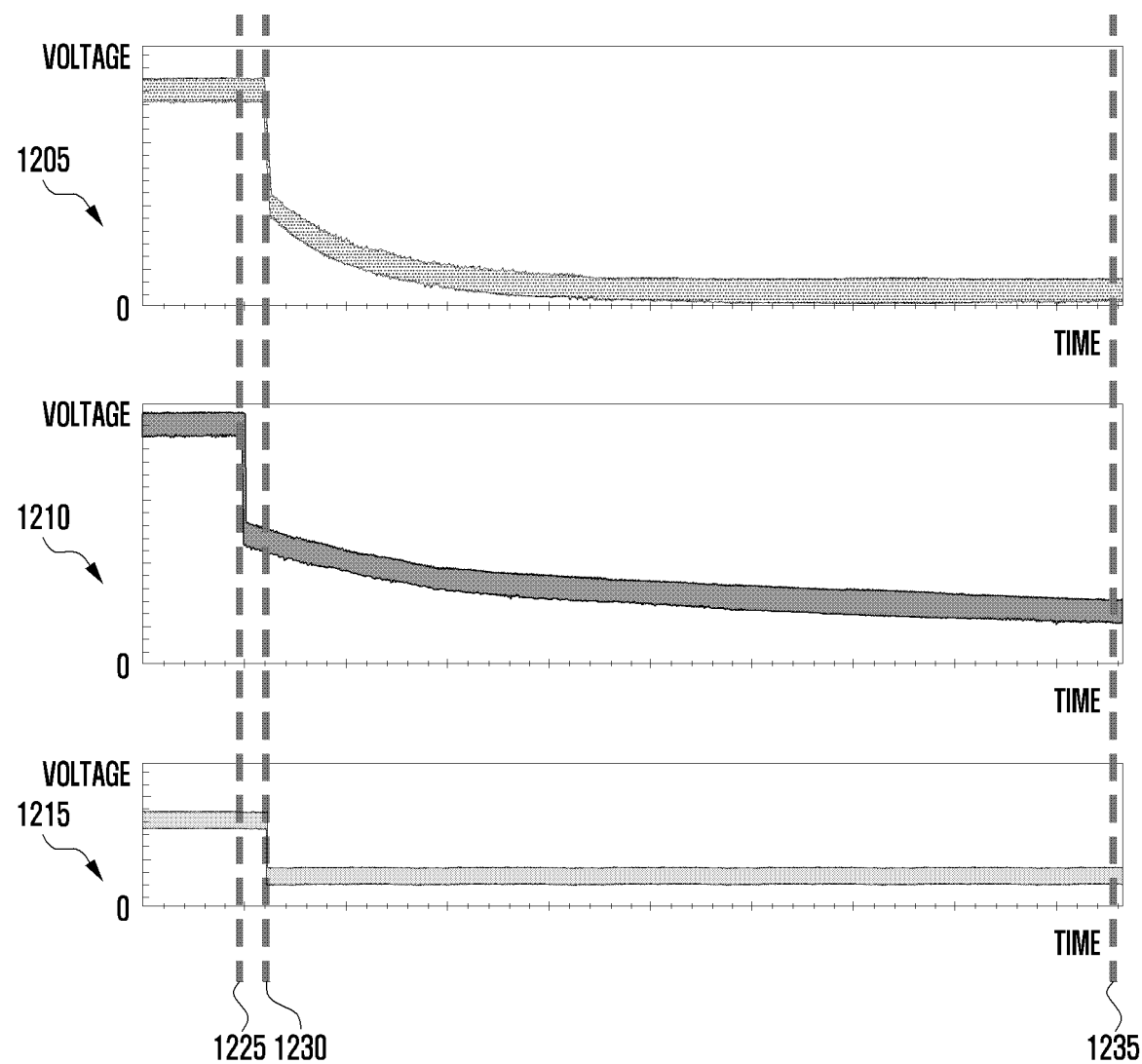
FIG. 12A is a graph illustrating a discharge time of an external electronic device in the case that the external electronic device is connected to an electronic device according to an embodiment of the disclosure.

FIG. 12A is a graph illustrating a discharge time of an external electronic device in the case that the external electronic device is connected to an electronic device according to a comparative example according to an embodiment of the disclosure.

Referring to FIG. 12A, a graph 1205 illustrates a voltage of an electronic device. A graph 1210 illustrates a voltage of an external electronic device (e.g., the external electronic device 300 of FIG. 2). A graph 1215 illustrates a voltage of a power supply circuit (e.g., the power supply circuit of FIG. 3) of the electronic device. In each graph, the x-axis may represent a time, and the y-axis may represent a voltage.

With reference to the graph 1210, the external electronic device 300 may be disconnected (e.g., detached) from the connector of the electronic device at a first time 1225. With reference to the graph 1205, the electronic device may recognize disconnection (e.g., detachment) of the external electronic device 300 at a second time 1230. After recognizing disconnection (e.g., detachment) of the external electronic device 300 at the second time 1230, the electronic device may control the power supply circuit to a deactivated state (e.g., cut off the electrical connection between the connector and the power supply circuit), as illustrated in the graph 1215. In this case, the external electronic device 300 may perform a discharging operation that enables a voltage stored in a capacitor of the power stage to be less than or equal to a designated voltage (e.g., about 1 v).

A time taken until the external electronic device 300 is discharged to a designated voltage (e.g., about 1 v) may be a time interval (e.g., about 4 seconds) between the second time 1230 and a third time 1235. In the case that the external electronic device 300 is reconnected (e.g., re-mounted) to the electronic device within a shorter time (e.g., about 1 second) than a time (e.g., about 4 seconds) consumed until the external electronic device 300 is discharged to a designated voltage (e.g., about 1 v), a malfunction of the external electronic device 300 may occur.

Figure 12B:
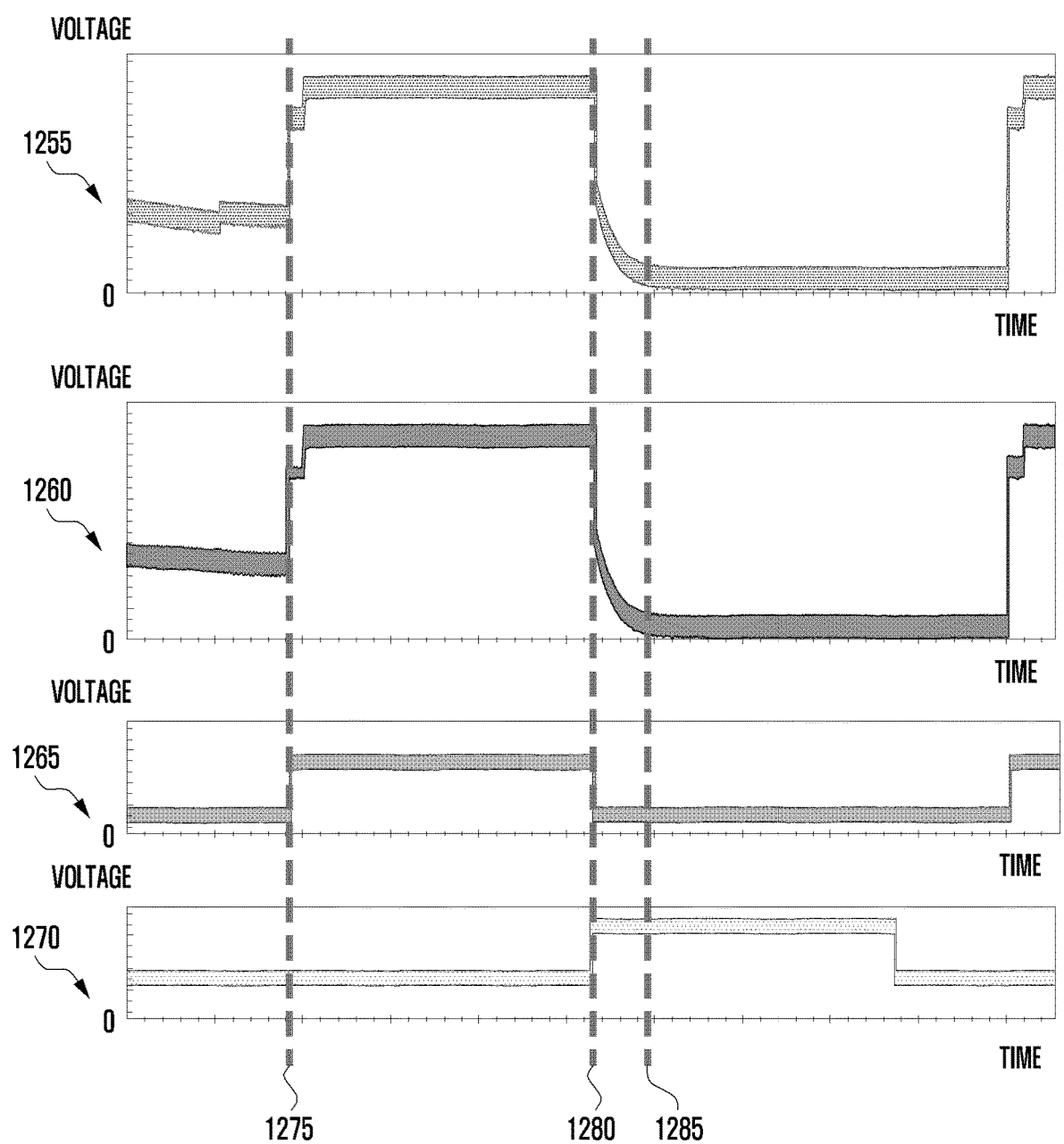
FIG. 12B is a graph illustrating a method of controlling discharge of an external electronic device in the case that the external electronic device is connected to an electronic device according to an embodiment of the disclosure.

FIG. 12B is a graph illustrating a method of controlling discharge of an external electronic device in the case that the external electronic device is connected to an electronic device according to an embodiment of the disclosure.

Referring to FIG. 12B, a graph 1255 illustrates a voltage of the electronic device 200. A graph 1260 illustrates a voltage of the external electronic device 300. A graph 1265 illustrates a voltage of a power supply circuit 270 of the electronic device 200. A graph 1270 illustrates a voltage of a discharge circuit 280 of the electronic device 200. In each graph, the x-axis may represent a time, and the y-axis may represent a voltage.

In an embodiment, with reference to the graph 1260, at a first time 1275, the external electronic device 300 may be connected (e.g., installed) to a connector (e.g., the connector 290 of FIG. 3) of the electronic device 200. With reference to the graph 1255, after recognizing the connection (e.g., mounting) of the external electronic device 300, the electronic device 200 may control the power supply circuit 270 to an activated state (e.g., electrically connect (e.g., see graph 1265) the connector 290 and the power supply circuit 270). The electronic device 200 may transmit a designated power source (or designated power) supplied from the power supply circuit 270 to the external electronic device 300 through the connector 290. The electronic device 200 may identify whether communication with the external electronic device 300 is connected while transmitting the designated power source (or designated power) to the external electronic device 300 through the connector 290. For example, the electronic device 200 may transmit a signal for requesting a communication connection to the external electronic device 300 through the connector 290 (e.g., the second terminal of the connector 290). In response to a signal for requesting a communication connection, the electronic device 200 may identify whether communication with the external electronic device 300 is connected based on whether a response signal is received from the external electronic device 300. When a response signal to the signal for requesting a communication connection is not received from the external electronic device 300, the electronic device 200 may identify that communication with the external electronic device 300 is not connected, and control the discharge circuit 280 to an activated state (e.g., electrically connect the connector 290 and the discharge circuit 280) (e.g., see graph 1270) at a second time 1280, and control the power supply circuit 270 to a deactivated state (e.g., cut off the electrical connection between the connector 290 and the power supply circuit 270) (e.g., see graph 1265). The electronic device 200 may discharge a current received from the external electronic device 300 using the discharge circuit 280 for a designated time (e.g., during a time interval between the second time 1280 and a third time 1285) (e.g., about 50 ms).

In another embodiment, the electronic device 200 may identify that communication with the external electronic device 300 is not connected and discharge a current received from the external electronic device 300 using the discharge circuit 280 for a designated time (e.g., during a time interval between the second time 1280 and the third time 1285) (e.g., about 50 ms) so that a voltage of the external electronic device 300 becomes less than or equal to a designated voltage (e.g., about 1 v).

It may be identified that a time required for discharging a current of the external electronic device 300 so that a voltage of the external electronic device 300 according to various embodiments becomes less than or equal to a designated voltage (e.g., about 1 v) is shortened (e.g., shortened from about 4 seconds to about 50 ms) compared to that of the prior art of FIG. 12A described above. The processor 210 of the electronic device 200 may rapidly discharge a current of the external electronic device 300 using the discharge circuit 280 before reconnection (e.g., re-mounting) of the external electronic device 300 is detected to smoothly perform a communication connection with the external electronic device 300, as a communication connection is attempted with the external electronic device 300 in a state in which a voltage of the external electronic device 300 is less than or equal to a designated voltage (e.g., about 1 v).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
  a connector;
  a power supply circuit;
  a discharge circuit;
  a first switch configured to control an electrical connection between the discharge circuit and a ground;
  a second switch configured to control an electrical connection between the connector and the power supply circuit; and
  a processor operatively connected to the connector, the power supply circuit, the discharge circuit, the first switch, and the second switch,
  wherein the processor is configured to:
    detect a connection of an external electronic device through the connector in a state in which the discharge circuit is activated,
    perform a first discharge by discharging a current of the connected external electronic device using the discharge circuit for a designated time based on the connection of the external electronic device,
    control the first switch to cut off the electrical connection between the discharge circuit and the ground after performing the first discharge,
    control the second switch to electrically connect the connector and the power supply circuit to supply designated power to the external electronic device through the connector, and
    perform communication with the external electronic device based on a communication connection with the external electronic device.

2. The electronic device of claim 1, wherein the processor is further configured to:
- transmit a signal for requesting the communication connection to the external electronic device through the connector while supplying the designated power to the external electronic device through the connector,
- determine that communication with the external electronic device is connected when a response signal to the signal requesting the communication connection is received from the external electronic device, and
- determine that communication with the external electronic device is not connected when a response signal to the signal for requesting the communication connection is not received from the external electronic device.

3. The electronic device of claim 2, wherein the processor is further configured to:
- control the second switch to cut off the electrical connection between the connector and the power supply circuit to stop power supplied to the external electronic device,
- control the first switch to electrically connect the discharge circuit and the ground, when it is determined that communication with the external electronic device is not connected,
- perform a second discharge by discharging the current of the connected external electronic device for the designated time using the discharge circuit,
- control the first switch to cut off the electrical connection between the discharge circuit and the ground, and
- control the second switch to electrically connect the connector and the power supply circuit to supply the designated power to the external electronic device, after performing the second discharge.

4. The electronic device of claim 1, wherein the first switch is disposed between the discharge circuit and the ground.

5. The electronic device of claim 1, wherein the designated time is greater than or equal to a discharge time at which a voltage of the external electronic device becomes less than or equal to a designated voltage.

6. The electronic device of claim 1, wherein the processor is further configured to perform the first discharging of discharging a current received from the external electronic device through the connector for the designated time so that a voltage of the external electronic device becomes less than or equal to a designated voltage using the discharge circuit.

7. The electronic device of claim 1, further comprising:
- a charging circuit; and
- a third switch configured to control an electrical connection between the connector and the charging circuit,
- wherein the processor is further configured to:
  - control the third switch to electrically connect the connector and the charging circuit when an external power source is connected to the connector, and
  - control the first switch to cut off the electrical connection between the discharge circuit and the ground to deactivate the discharge circuit in an activated state based on the electrical connection between the connector and the charging circuit.

8. The electronic device of claim 1,
- wherein the processor is further configured to receive information related to the external electronic device from the external electronic device through the connector based on the connection of the external electronic device, and
- wherein the information related to the external electronic device comprises identification information of the external electronic device.

9. The electronic device of claim 1, wherein the processor is further configured to:
- control the second switch to electrically connect the connector and the power supply circuit to supply the designated power to the external electronic device, when a connection of the external electronic device is detected through the connector in a state in which the discharge circuit is deactivated,
- control the second switch to cut off the electrical connection between the connector and the power supply circuit,
- control the first switch to electrically connect the discharge circuit and the ground based on a failure of a communication connection with the external electronic device,
- discharge a current of the external electronic device received through the connector using the discharge circuit for the designated time,
- control the first switch to cut off the electrical connection between the discharge circuit and the ground, and
- control the second switch to electrically connect the connector and the power supply circuit to supply the designated power to the external electronic device.

10. The electronic device of claim 9, wherein the processor is further configured to discharge a current received from the external electronic device through the connector for the designated time so that a voltage of the external electronic device becomes less than or equal to a designated voltage using the discharge circuit.

11. A method for an electronic device to control discharge of an external electronic device, the method comprising:
- detecting a connection of an external electronic device through a connector in a state in which a discharge circuit of the electronic device is activated;
- performing a first discharge of discharging a current of the connected external electronic device for a designated time using the discharge circuit based on the connection of the external electronic device;
- controlling a first switch to cut off an electrical connection between the discharge circuit and a ground after performing the first discharge;
- controlling a second switch to electrically connect the connector and a power supply circuit to supply designated power to the external electronic device; and
- performing communication with the external electronic device based on a successful a communication connection with the external electronic device.

12. The method of claim 11, further comprising:
- transmitting a signal for requesting the communication connection to the external electronic device through the connector while supplying the designated power to the external electronic device through the connector;
- determining that communication with the external electronic device is connected, when a response signal to a signal for requesting the communication connection is received from the external electronic device; and
- determining that communication with the external electronic device is not connected, when a response signal to a signal for requesting the communication connection is not received from the external electronic device.

13. The method of claim 12, further comprising:
- controlling, when it is determined that communication with the external electronic device is not connected, the second switch to cut off the electrical connection between the connector and the power supply circuit to stop power supplied to the external electronic device;

controlling the first switch to electrically connect the discharge circuit and the ground;

performing a second discharge of discharging a current of the connected external electronic device using the discharge circuit for the designated time;

controlling the first switch to cut off the electrical connection between the discharge circuit and the ground after performing the second discharge; and controlling the second switch to electrically connect the connector and the power supply circuit to supply the designated power to the external electronic device.

14. The method of claim 11, wherein the first switch is disposed between the discharge circuit and the ground.

15. The method of claim 11, wherein the designated time is greater than or equal to a discharge time at which a voltage of the external electronic device becomes less than or equal to a designated voltage.

16. The method of claim 11, wherein the performing of the first discharge comprises discharging a current received from the external electronic device through the connector for the designated time so that a voltage of the external electronic device becomes less than or equal to a designated voltage using the discharge circuit.

17. The method of claim 11, further comprising:

controlling, when an external power source is connected to the connector, a third switch to electrically connect the connector and a charging circuit; and controlling the first switch to cut off the electrical connection between the discharge circuit and the ground to deactivate the discharge circuit in an activated state based on the electrical connection between the connector and the charging circuit.

18. The method of claim 11, further comprising:

receiving information related to the external electronic device from the external electronic device through the connector based on the connection of the external electronic device, wherein the information related to the external electronic device comprises identification information of the external electronic device.

19. The method of claim 11, further comprising:

controlling the second switch to electrically connect the connector and the power supply circuit to supply the designated power to the external electronic device when a connection of the external electronic device is detected through the connector in a state in which the discharge circuit is deactivated;

controlling the second switch to cut off the electrical connection between the connector and the power supply circuit based on a failure of a communication connection with the external electronic device;

controlling the first switch to electrically connect the discharge circuit and the ground;

discharging a current of the external electronic device received through the connector using the discharge circuit for the designated time;

controlling the first switch to cut off the electrical connection between the discharge circuit and the ground; and controlling the second switch to electrically connect the connector and the power supply circuit to supply the designated power to the external electronic device.

20. The method of claim 19, wherein the discharging of the current of the external electronic device comprises discharging a current received from the external electronic device through the connector for the designated time so that a voltage of the external electronic device becomes less than or equal to a designated voltage using the discharge circuit.

* * * * *